United States Patent [19]
Kakiage et al.

[11] Patent Number: 5,968,166
[45] Date of Patent: Oct. 19, 1999

[54] INFORMATION PROCESSING APPARATUS AND METHOD, AND SCHEDULING DEVICE FOR REDUCING INACTIVITY DUE TO WAIT STATE

[75] Inventors: Touru Kakiage, Neyagawa; Masato Suzuki, Toyonaka, both of Japan

[73] Assignee: Matsushita Electric Industrial Co., Ltd., Kadoma, Japan

[21] Appl. No.: 08/820,785

[22] Filed: Mar. 19, 1997

[30] Foreign Application Priority Data

Mar. 22, 1996  [JP]  Japan .................................. 8-065965

[51] Int. Cl.⁶ ..................................................... G06F 9/30
[52] U.S. Cl. .......................... 712/225; 712/214; 712/219
[58] Field of Search ................... 712/214, 216, 712/217, 218, 219, 225, 23, 41, 705, 706, 208, 210, 220, 245

[56] References Cited

U.S. PATENT DOCUMENTS

| | | | |
|---|---|---|---|
| 4,831,515 | 5/1989 | Kamada et al. | 712/217 |
| 5,428,761 | 6/1995 | Herlihy et al. | 711/130 |
| 5,526,499 | 6/1996 | Bernstein et al. | 395/392 |
| 5,537,560 | 7/1996 | Boggs et al. | 395/595 |
| 5,555,432 | 9/1996 | Hinton et al. | 395/800.23 |
| 5,584,009 | 12/1996 | Garibay, Jr. et al. | 711/117 |
| 5,651,124 | 7/1997 | Shen et al. | 395/391 |
| 5,659,782 | 8/1997 | Senter et al. | 395/800.23 |
| 5,666,507 | 9/1997 | Flora | 395/394 |
| 5,748,937 | 5/1998 | Abramson et al. | 395/394 |

FOREIGN PATENT DOCUMENTS 4156635  5/1992  Japan .

*Primary Examiner*—Viet D. Vu
*Attorney, Agent, or Firm*—Renner, Otto, Boisselle & Sklar, P.L.L.

[57] ABSTRACT

An information processing apparatus includes an instruction storage for storing a plurality of instructions and a central processing unit for fetching the instructions from the instruction storage device so as to execute the instructions. The central processing unit executes a process to perform operations which require at least two machine cycles of the central processing unit by separately executing a first instruction for setting first data required for operations and a second instruction for fetching second data obtained by the operations. The machine cycle is a time unit for executing an instruction by the central processing unit. The central processing unit executes at least one third instruction after executing the first instruction and before executing the second instruction, the third instruction not requiring the second data.

23 Claims, 10 Drawing Sheets

INFORMATION PROCESSING APPARATUS AND METHOD, AND SCHEDULING DEVICE FOR REDUCING INACTIVITY DUE TO WAIT STATE

BACKGROUND OF THE INVENTION

1. FIELD OF THE INVENTION

The present invention relates to an information processing apparatus and method using a central processing unit for fetching an instruction stored in a storage and executing the instruction, and a scheduling device for arranging instructions for information processing. In particular, the present invention relates to an information processing apparatus and method, and a scheduling device for performing a process which requires a relatively long time period.

2. DESCRIPTION OF THE RELATED ART

Information processing apparatuses such as microcomputers, microprocessors and the like have been proliferated and are used in various fields due to the recent development in electronic technologies. Specifically in recent years, the operating frequency of central processing units (CPUs) such as microcomputers, microprocessors and the like has been increased due to the size reduction of semiconductor devices and development in high-speed circuit technologies. Some CPUs operate at a frequency of as high as several hundred megahertz. The performance of the CPU is improved by the higher operating frequency, but the access rate from the CPU to an external memory for storing instruction codes to be executed and data is relatively slow, namely, several to several tens of times the operating frequency of the CPU. Since access to the external memory from the CPU which is made for performing an operation requires a relatively long time period, the performance of the information processing apparatus as a whole is not improved.

In addition to access to the external memory, operations which require a relatively long time period (e.g., mathematical operation) are performed by an information processing apparatus including a CPU which can operate at a relatively high speed. When performing such operations, the significant difference in process rate between inside and outside the CPU results in a lower information process efficiency.

Hereinafter, a structure of a conventional information processing apparatus and the operation thereof for accessing an external memory will be described.

FIG. 9 is a schematic view of a main part of a conventional information processing apparatus 800. As shown in FIG. 9, the information processing apparatus 800 includes a processor 810 and an external memory 850. The processor 810 and the external memory 850 are connected to each other via an external address bus 851 (851*a* and 851*b*) and an external data bus 852 (852*a* and 852*b*).

The processor 810 includes a central processing unit (hereinafter, referred to as a "CPU") 820, a bus control unit 830, and a ROM 840. The bus control unit 830 includes an address decoder 833, a control circuit 834, a memory access signal generation section 835, an address interface section 836 and a data interface section 837. The CPU 820 and the bus control unit 830 are connected to each other via an address bus 821 for sending addresses and a data bus 822 for transferring data. From the ROM 840, programs and instructions are sent to the CPU 820 via an instruction bus 841.

As shown in FIG. 9, an address which is output from the CPU 820 is supplied to the decoder 833 and the address interface section 836 via the address bus 821. The data bus 822 is connected to the data interface section 837. The address interface section 836 is connected to the external address bus 851 via the address bus 851*a*, and the data interface section 837 is connected to the external data bus 852 via the data bus 852*a*.

The CPU 820 outputs a read request signal 901 to the bus control unit 830 to request a read operation of data, and outputs a write request signal 902 to the bus control unit 830 to request a write operation of data. The read request signal 901 and the write request signal 902 are input to the control circuit 834 of the bus control unit 830. A decode address 903 is supplied to the address decoder 833 via a part of the address bus 821. The address decoder 833 decodes the decode address 903 and outputs the result to the control circuit 834 as a device identification signal 904. The device identification signal 904 indicates the target of access; e.g., whether the external memory 850 should be accessed from the CPU 820, or which device in the processor 810 should be accessed from the CPU 820.

The control circuit 834 outputs an external access start signal 905, an address control signal 906 for controlling the address interface section 836, and a data control signal 907 for controlling the data interface section 837 based on the device identification signal 904, the read request signal 901 and the write request signal 902. The control circuit 834 also outputs a response signal 908 in response to the read request signal 901 and the write request signal 902 from the CPU 820. The memory access signal generation section 835 outputs a memory access signal 909 for accessing the external memory 850 based on the external access start signal 905 supplied from the control circuit 834. The external memory 850 receives the memory access signal 909, and when the access is completed, the external memory 850 outputs an external response signal 910 for notifying the processor 810 of the completion of the access operation. The external response signal 910 is supplied to the control circuit 834 of the bus control unit 830.

The conventional information processing apparatus 800 having the above-described structure operates, for example, in the following manner. First, an example of a program stored in the ROM 840 including instructions which are executed solely by the CPU 820 and instructions which are executed cooperatively by the CPU 820 and the bus control unit 830 will be described. Regarding each of the following instructions, the operation indicated by the instruction is described in the parentheses. For example, instructions 11 through 13 indicate a process for accessing the external memory 850 and using data obtained as a result of the access operation. Instructions 14 through 17 indicate a process performed solely by the CPU 820. The numerical figures, calculations, and the like used in the following instructions are simply illustrative. Other numerical figures and calculations may also be used.

Instruction 11: MOV @mem_loc1, D0

(Data is read from address mem_loc1 of the external memory 850 and stored in register D0 in the CPU 820.)

Instruction 12: ADD #10, D0

(The content in register D0 in the CPU 820 and 10 are added together, and the result is stored again in register D0.)

Instruction 13: MOV @mem_loc2, D2

(Data is read from address mem_loc2 of the external memory 850 and stored in register D2 in the CPU 820.)

Instruction 14: MUL D0, D2

(The content in register D2 in the CPU 820 is multiplied by the content in register D0, and the result is stored again in register D2.)

Instruction 15: ADD #1, D1

(The content in register D1 in the CPU 820 and 1 are added together, and the result is stored again in register D1.)

Instruction 16: ADD #4, A0

(The content in register A0 in the CPU 820 and 4 are added together, and the result is stored again in register A0.)

Instruction 17: ADD #4, A1

(The content in register A1 in the CPU 820 and 4 are added together, and the result is stored again in register A1.)

With reference to FIGS. 10A and 10B, the operation of the information processing apparatus 800 for running the above-described program will be described from cycles t1 through t13. FIG. 10A and 10B are operational timing diagrams of the information processing apparatus 800. Cycles t1 through t6 are shown in FIG. 10A, and cycles t7 through t13 are shown in FIG. 10B. In this example, the read time of the external memory 850, namely, the time period from the external memory 850 receives the memory access signal 909 and the address output to the external address bus 851 until the external memory 850 outputs the data to the external data bus 852 is 4 machine cycles. Data "data1" is pre-stored at address mem_loc1 of the external memory 850, and data "data2" is pre-stored at address mem_loc2 of the external memory 850.

When the instruction for reading the data from the external memory 850 (instruction 11 or 13) is processed by the CPU 820, the address of the data to be read (mem_loc1 or mem_loc2) is output to the external address bus 851 via the address bus 821 and the address interface section 836 (cycle t1 or t6). However, the read time of the external memory 850 is 4 cycles, which is longer than a time unit of the CPU 820 (1 machine cycle). Accordingly, until the data output from the external memory 850 (data1 or data2) reaches the data bus 822 via the external data bus 852 and the data interface section 837 (until cycle t4 or t9), the CPU 820 cannot perform the subsequent processes. In other words, the CPU 820 is put into a wait state before executing the subsequent instructions until the read operation of the data from the external memory is completed. Also in the case of performing a mathematical operation which also requires a relatively long process time, the CPU 820 is put into a wait state before executing the subsequent instructions until the mathematical operation is completed.

In such a conventional information processing apparatus, the CPU is put into a wait state before executing the subsequent instructions due, for example, to read operations of the data from the external memory or mathematical operations both of which require a relatively long time period. Thus, it is demanded to minimize the penalty (e.g., reduction in the process efficiency) due to the wait time.

In order to shorten the apparent access time to the external memory, for example, it has been proposed to mount a cache memory for buffering the data which has been once read or a prefetch buffer for prefetching the data from the external memory in a microcomputer or microprocessor.

However, mounting a cache memory or a prefetch buffer in a microcomputer or microprocessor significantly increases the size of hardware although reducing the penalty. Moreover, the access time to the cache memory and the time required for the complicated control reduces the operating frequency.

SUMMARY OF THE INVENTION

According to one aspect of the invention, an information processing apparatus includes an instruction storage for storing a plurality of instructions and a central processing unit for fetching the instructions from the instruction storage device so as to execute the instructions. The central processing unit executes a process to perform operations which require at least two machine cycles of the central processing unit by separately executing a first instruction for setting first data required for operations and a second instruction for fetching second data obtained by the operations. The machine cycle is a time unit for executing an instruction by the central processing unit. The central processing unit executes at least one third instruction after executing the first instruction and before executing the second instruction, the third instruction not requiring the second data.

In one embodiment of the invention, the information processing apparatus further includes a memory device. The operations include a read operation of information stored in the memory device, the first data is a read address of the information to be read in the memory device, and the read address is set in a prescribed memory area by the first instruction.

In one embodiment of the invention, the first instruction includes a command for starting the read operation based on the read address set in the memory area.

In one embodiment of the invention, the operations include a mathematical operation, the first data is operand data for the mathematical operation, and the operand data is set in a prescribed memory area by the first instruction.

In one embodiment of the invention, the first instruction includes a command for starting the mathematical operation based on the operand data set in the memory area.

In one embodiment of the invention, the information processing apparatus further includes first and second registers for holding data and a control circuit for controlling the first and second registers. The control circuit writes the first data into the first register based on the first instruction, preforms the operations based on the first data written in the first register, writes the second data obtained by the operations into the second register, and transfers the second data held in the second register to the central processing unit based on the second instruction.

In one embodiment of the invention, the information processing further includes a memory device. The control circuit controls access to the memory device, the operations include a read operation of information stored in the memory device, the first data is a read address in the memory device of the information to be read, and the second data is the information read from the memory device.

In one embodiment of the invention, the first instruction includes a command for starting the read operation based on the read address set in the first register.

In one embodiment of the invention, the central processing unit fetches the first instruction from the instruction storage and outputs the read address of the information in the memory device to be read; after the address is output, executes at least one third instruction which does not require the information read from the memory device; and after the at least one third instruction is executed, fetches the second instruction from the instruction storage to execute the second instruction. The first register receives and holds the read address output from the central processing unit under the control of the control circuit. The memory device receives the read address held in the first register and outputs the information based on the received read address under the control of the control circuit while the at least one third instruction is being executed. The second register receives and holds the information output from the memory device under the control of the control circuit. The control circuit transfers the information held in the second register by the second instruction executed by the central processing unit.

In one embodiment of the invention, the information processing apparatus further includes an address decoder for decoding at least a part of the address which is output from the central processing unit. A first address area is assigned for the first register and a second address area is assigned for the second register, the first instruction is a write instruction for writing the read address into the first address area, and the second instruction is a read instruction for reading the information held in the second address area. The central processing unit outputs an address into which the read address is to be written based on the first instruction and outputs the address holding the information to be read based on the second instruction. The control circuit detects that the address decoded by the address decoder is equal to the address in the first address area in execution of the first instruction and thus acknowledges a write operation into the first register. The control circuit detects that the address decoded by the address decoder is equal to the address in the second address area in execution of the second instruction and thus acknowledges a read operation from the second register.

In one embodiment of the invention, the operations include a mathematical operation, the first data is operand data for the mathematical operation, and the second data is a mathematical operation result data obtained by treating the operand data by the mathematical operation.

In one embodiment of the invention, the first instruction includes a command for starting the mathematical operation based on the operand data set in the first register.

In one embodiment of the invention, in the case where the control circuit detects execution of the second instruction before the write operation into the second register is completed, the control circuit requests the central processing unit to halt execution of the second instruction; and when the write operation is completed, the control circuit releases the halt and transfers the second data written in the second register to the central processing unit.

In one embodiment of the invention, the central processing unit executes a prescribed number of third instructions determined by characteristics of the operations, and thus prevents the second instruction from being executed before the write operation of the second data into the second register is completed.

In one embodiment of the invention, the information processing apparatus further includes a state register. The control circuit sets the state register to a first state for writing the first data into the first register, and sets the state register to a second state for writing the second data into the second register. The central processing unit executes an instruction for confirming that the state register is in the second state before executing the second instruction.

In one embodiment of the invention, in the case where the control circuit detects execution of the second instruction before the write operation into the second register is completed, the control circuit requests the central processing unit to perform a subroutine program.

In one embodiment of the invention, the subroutine program is an interrupt program, and the second instruction is re-executed in the interrupt program.

According to another aspect of the invention, a scheduling device for translating a first program including a plurality of instructions written in either one of a high-level language or an assembly language into a second program described in a machine language and for arranging the order of the plurality of instructions of the first program during the translation of the first program into the second program is provided. The scheduling device includes a first detector for determining a process time required to complete a process performed by each of the plurality of instructions and detecting a process requiring at least two machine cycles as a long-period process. The machine cycle being a time unit for executing an instruction by a central processing unit for running the program. The scheduling device also includes a second detector for detecting whether or not the program includes at least one subsequent instruction which can be executed by the central processing unit without depending on a process result obtained by the long-period process; and an order arrangement device for arranging the order of the plurality of instructions based on the detection results of the first detector and the second detector. In the case where the first detector detects a long-period process and the second detector detects the at least one subsequent instruction, the order arrangement device separates the long-period process into a first instruction for setting first data required for the operations performed in the long-period process and a second instruction for fetching second data obtained based on the operations, and inserts the at least one instruction detected by the second detector as a third instruction after the first instruction and before the second instruction.

According to still another aspect of the invention, an information processing method using an instruction storage for storing a plurality of instructions and a central processing unit for fetching the instructions from the instruction storage so as to execute the instructions is provided. For example, a process requiring at least two machine cycles is performed. The machine cycle is a time unit for executing an instruction by the central processing unit. The process includes operations based on first data, and second data is obtained by the operations. The method includes the steps of: executing a first instruction for setting the first data required for the operations; executing at least one third instruction after executing the first instruction, the third instruction not requiring the second data; and executing a second instruction for fetching the second data obtained by the operations.

According to still another aspect of the invention, an information processing method using an instruction storage for storing a plurality of instructions, a central processing unit for fetching the instructions from the instruction storage so as to execute the instructions, and first and second registers for holding data is provided. For example, a process requiring at least two machine cycles is performed. The machine cycle is a time unit for executing an instruction by the central processing unit. The process includes operations based on first data, and second data is obtained by the operations. The method includes the steps of: executing a first instruction for setting the first data required for the operation; writing the first data into the first register based on the first instruction; executing at least one third instruction after executing the first instruction, the third instruction not requiring the second data; performing the operations based on the first data written in the first register while the at least one third instruction is being executed, and writing the second data obtained by the operations into the second register; executing a second instruction for fetching the second data obtained by the operations; and transferring the second data held in the second register based on the second instruction.

In one embodiment of the invention, the information processing method further includes the steps of: in the case where the second instruction is fetched before a write operation of the second data into the second register is completed, requesting the central processing unit to halt execution of the second instruction; and when the write operation of the second data into the second register is completed, releasing the halt and transferring the second data written in the second register to the central processing unit.

In one embodiment of the invention, the step of executing the at least one third instruction includes the step of executing a plurality of third instructions determined by characteristics of the operations, thereby preventing the second instruction from being executed before the write operation of the second data into the second register is completed.

Thus, the invention described herein makes possible the advantages of (1) providing an information processing apparatus and method for absorbing the difference between the process rate for performing operations which require a relatively long time period such as a read operation of data from an external memory and the process rate for executing an instruction in the CPU, merely by a slight increase in the size of hardware, (2) providing an information processing apparatus and method for reducing a wait time of the CPU by absorbing the above-described difference, and (3) providing a scheduling device usable with the information processing apparatus for arranging the order of instructions to absorb the above-described rate difference.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
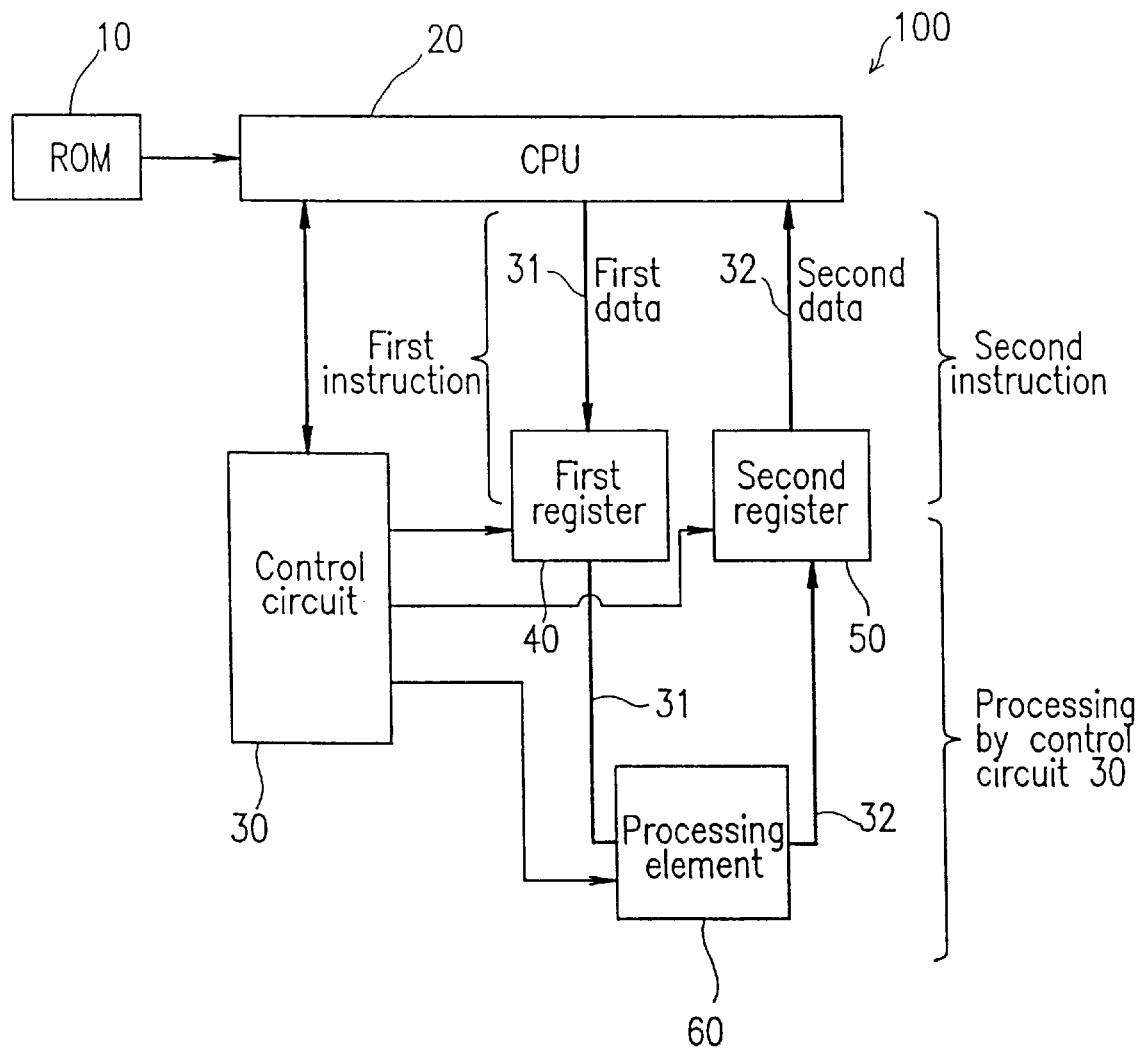
FIG. 1 is a block diagram schematically showing an information processing apparatus according to one example of the present invention.

FIG. 1 is a block diagram schematically showing a basic structure of an information processing apparatus 100 according to the present invention. As shown in FIG. 1, the information processing apparatus 100 includes an instruction storage section (e.g., a ROM) 10 for storing a plurality of instructions and a central processing unit (hereinafter, referred to as a "CPU") 20 for fetching an instruction from the ROM 10 and executing the instruction. When a process to be performed is a process for obtaining second data by performing an operation based on first data and also requires at least 2 machine cycles of the CPU 20, the CPU 20 performs such a process in the state of being divided into two instructions, i.e., a first instruction and a second instruction. By the first instruction, the first data required for the operation is set; and by the second instruction, the second data obtained by the operation is fetched. After execution of the first instruction and before start of execution of the second instruction, at least one third instruction which does not require the second data is executed. In this specification, 1 machine cycle is a time unit for executing an instruction by the CPU 20. Also in this specification, a process which requires at least 2 machine cycles is referred to as a "long-period process".

The third instruction, which does not require the second data obtained by the operation, can be executed before the completion of the operation for obtaining the second data. Accordingly, the long-period process and the third instruction can be executed in parallel. Thus, the wait time before the CPU 20 executes the second instruction after the execution of the first instruction can be effectively utilized. Due to such a system, the difference between the time period required for the long-period process and one machine cycle of the CPU 20 can be absorbed (or apparently eliminated). Thus, the wait time of the information processing apparatus 100 as a whole can be actually reduced.

The long-period process divided into the first and second instructions is performed by the hardware, for example, in the following manner. As shown in FIG. 1, the information processing apparatus 100 includes a first register 40 and a second register 50 both for holding data, and a control circuit 30 for controlling the first and second registers 40 and 50. As can be appreciated from FIG. 1, the control circuit 30 writes first data 31 into the first register 40 based on the first instruction executed by the CPU 20. The control circuit 30 then performs an operation using a processing element 60 based on the first data 31 written in the first register 40, and writes second data 32 obtained by the operation to the second register 50. The control circuit 30 further transfers the second data 32 held in the second register 50 to the CPU 20 based on the second instruction executed by the CPU 20. The operations of the processing element 60, the first register 40, and the second register 50 are controlled by prescribed control signals which are output from the control circuit 30.

The processing element 60 is, for example, a memory device such as an external memory or a mathematical operation device for performing mathematical operations. In the following examples, a read process of data from an external memory and a process for mathematical operations performed using a mathematical operation device will be described as examples of the long-period process.

EXAMPLE 1

Figure 2:
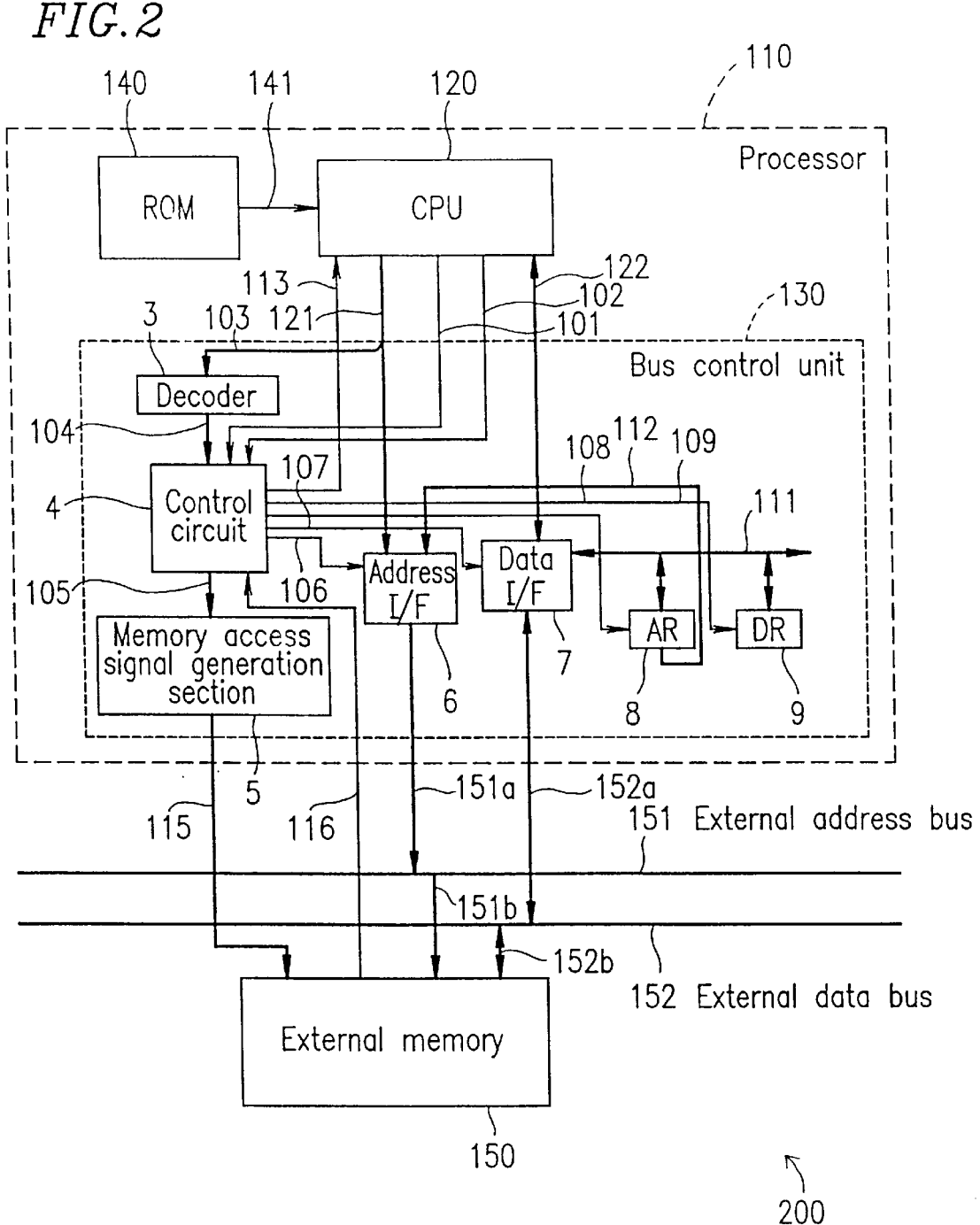
FIG. 2 is a block diagram schematically showing an exemplary structure of the information processing apparatus shown in FIG. 1 when applied for a read process of data from an external memory.

FIG. 2 is a schematic block diagram of an information processing apparatus 200 according to a first example of the present invention. The information processing apparatus 200 includes a processor 110 and an external memory 150. In the first example, a read process of information stored in the external memory 150 will be described as an example of the long-period process. The first data required for a read operation performed in the read process is an address in the external memory 150 of the information or data to be read (hereinafter, referred to as a "read address"). The second data obtained as a result of the read operation is the information which read from the external memory 150.

As shown in FIG. 2, the processor 110 and the external memory 150 are connected to each other via an external address bus 151 (151a and 151b) and an external data bus 152 (152a and 152b).

The processor 110 includes a central processing unit (hereinafter, referred to as a "CPU") 120, a bus control unit 130, and a ROM 140 as an instruction storage section. The bus control unit 130 includes an address decoder 3, a control circuit 4, a memory access signal generation section 5, an address interface section 6, and a data interface section 7. The bus control unit 130 further includes a read buffer address register 8 and a read buffer data register 9. The CPU 120 and the bus control unit 130 are connected to each other via an address bus 121 for sending addresses and a data bus 122 for transferring data. From the ROM 140, programs and instructions are sent to the CPU 120 via an instruction bus 141.

As can be appreciated from in FIG. 2, a n address which is output from the CPU 120 is supplied to the decoder 3 and the address interface section 6 via the address bus 121. The data bus 122 is connected to the data interface section 7. The address interface section 6 is connected to the external address bus 151 via the address bus 151a, and the data interface section 7 is connected to the external data bus 152 via the data bus 152a. An output from the read buffer address register 8 is supplied to the address interface section 6 via an address bus 112 for the register (hereinafter, referred to simply as the "address bus 112"). The read buffer address register 8 and the read buffer data register 9 are connected to the data interface section 7 via a data bus 111 for the registers (hereinafter, referred to simply as the "address bus 111").

The CPU 120 outputs a read request signal 101 to the bus control unit 130 to request a read operation, and outputs a write request signal 102 to the bus control unit 130 to request a write operation. The read request signal 101 and the data write signal 102 are input to the control circuit 4 of the bus control unit 130. A decode address 103 is supplied to the address decoder 3 via a part of the address bus 121. The address decoder 3 decodes the decode address 103 and outputs the result to the control circuit 4 as a device identification signal 104. The device identification signal 104 indicates the target of access; e.g., whether the external memory 150 should be accessed by the CPU 120, or which device in the processor 110 should be accessed by the CPU 120.

The control circuit 4 outputs an external access start signal 105, an address control signal 106 for controlling the address interface section 6, a data control signal 107 for controlling the data interface section 7, an address write signal 108 for controlling the read buffer address register 8, and a data write signal 109 for controlling the read buffer data register 9 based on the device identification signal 104, the read request signal 101 and the write request signal 102. The control circuit 4 also outputs a response signal 113 in response to the read request signal 101 and the write request signal 102 from the CPU 120. The memory access genera-tion section 5 outputs a memory access signal 115 for accessing the external memory 150 based on the external access start signal 105 supplied from the control circuit 4. The external memory 150 receives the memory access signal 115, and when the access operation is completed, the external memory 150 outputs an external response signal 116 for notifying the processor 110 of the completion of the access operation. The external response signal 116 is supplied to the control circuit 4 of the bus control unit 130.

The information processing apparatus 200 having the above-described structure operates, for example, in the following manner. An example of a program stored in the ROM 140 including instructions which are performed solely by the CPU 120 and instructions which are executed cooperatively by the CPU 120 and the bus control unit 130 will be described. Regarding each of the following instructions 1 through 9, the operation indicated by the instruction is described in the parentheses. For example, instructions 1 through 4 and 8 indicate a process for accessing the external memory 150 and using data obtained as a result of the access operation. Instructions 1 through 4 and 8 are executed cooperatively by the CPU 120 and the bus control unit 130. Instructions 5 through 7 and 9 indicate a process performed solely by the CPU 120 (e.g., addition and multiplication).

The program stored in the ROM 140 is written in a "machine language" consisting of bit streams of "0" and "1". In this specification, the program is described by mnemonic representation in order to indicate the meaning of each instruction. For clear comparison with the operation of the conventional information processing apparatus 800, instructions for executing the same processes as described regarding the conventional information processing apparatus 800 will be given. The numerical figures, calculations, and the like used in the following instructions are simply illustrative. Other numerical figures and calculations may also be used.

Instruction 1: MOV @mem_loc1, D0

(Data is read from address mem_loc1 of the external memory 150 and stored in register D0 in the CPU 120.)

Instruction 2: ADD #10, D0

(The content in register D0 in the CPU 120 and 10 are added together, and the result is stored again in register D0.)

Instruction 3: MOV #mem_loc2, D3

(Value mem_loc2 is stored in register D3 in the CPU 120. Value mem_loc2 is the address in the external memory 150 of the data to be read next.)

Instruction 4: MOV D3, @rb_addr (The content in register D3 in the CPU 120 is written into address rb_addr. For address rb_addr, the read buffer address register 8 is assigned.)

Instruction 5: ADD #1, D1

(The content in register D1 in the CPU 120 and 1 are added together, and the result is stored again in register D1.)

Instruction 6: ADD #4, A0

(The content in register A0 in the CPU 120 and 4 are added together, and the result is stored again in register A0.)

Instruction 7: ADD #4, A1

(The content in register A1 in the CPU 120 and 4 are added together, and the result is stored again in register A1.)

Instruction 8: MOV @rb_data, D2

(The content at address rb_data is written into register D2 in the CPU 120. For address rb_data, the read buffer data register 9 is assigned.)

Instruction 9: MUL D0, D2

(The content in register D2 is multiplied by the content in register D0, and the result is stored again in register D2.)

As can be appreciated from the above exemplary program of the read processes from the external memory 150, in the case where the read data is to be used immediately after a request for the read operation, the read process is performed using the same read instruction as the conventional instruction. For example, in the case where the data read from the external memory 150 is to be processed by instruction 2 immediately after the read operation, the read process is performed using instruction 1, which is the same as the conventional read instruction (instruction 11).

In the case where a plurality of subsequent instructions can be executed after a request for the read operation and before the obtained data is used for the first time, the read process is divided into two instructions so as to be performed separately. The two instructions are: an instruction for setting a read address in the read buffer address register 8 (instruction 4) and an instruction for fetching the data held in the read buffer data register 9 (instruction 8). For example, while the read operation from the external memory 150 is being performed, instructions 5 through 7 which do not require the data which is read from the external memory 150 can be executed solely by the CPU 120 as described below.

First, by execution of instruction 4, the read address in the external memory 150 is output from the CPU 120. Under the control of the control circuit 4, the read address which is output by the CPU 120 is set in the read buffer address register 8. After executing instruction 4 (i.e., after outputting the read address), the CPU 120 executes instructions which do not require the data read from the external memory 150 (i.e., instructions 5 through 7). While instructions 5 through 7 are being executed, the control circuit 4 reads data from the external memory 150 using the read address held in the read buffer address register 8. For example, the read address held in the read buffer address register 8 is supplied to the external memory 150 by the control circuit 4, and the external memory 150 outputs data corresponding to the read address received. The data read from the external memory 150 is written into the read buffer data register 9 under the control of the control circuit 4. After executing instructions 5 through 7, the CPU 120 executes instruction 8 for fetching the data held in the read buffer data register 9. For example, the data held in the read buffer data register 9 is transferred to the CPU 120 under the control of the control circuit 4.

As described above, the read process from the external memory 150 is performed by two divided instructions 4 and 8, and instructions 5 through 7 are inserted between instructions 4 and 8. Such rearrangement of instructions is referred to as "scheduling of instructions".

Next, with reference to FIGS. 3A and 3B, the operation of the information processing apparatus 200 for running the above-described program will be described.

Figure 3A:
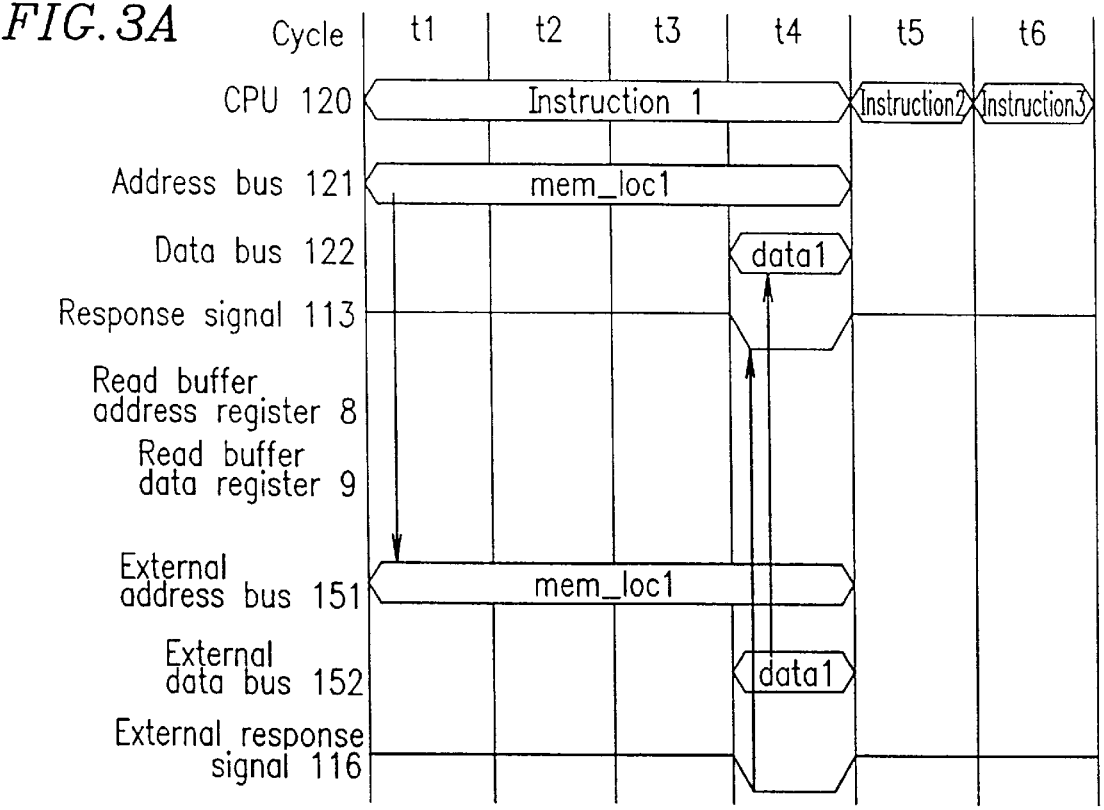
FIGS. 3A and 3B are operational timing diagrams of the information processing apparatus shown in FIG. 2 for running an exemplary program.
Figure 3B:
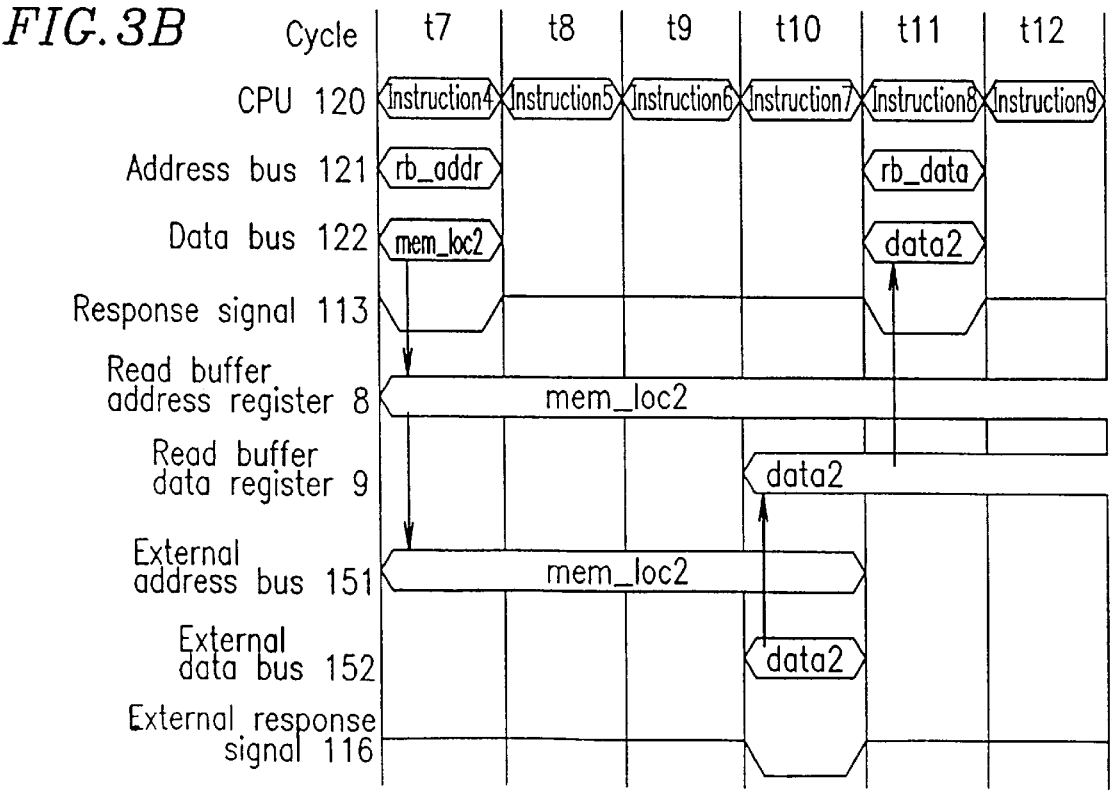

FIGS. 3A and 3B are operational timing diagrams of the information processing apparatus 200. FIGS. 3A and 3B show the instructions executed by the CPU 120, values on the address bus 121 and the data bus 122, the state of the response signal 113, values held in the read buffer address register 8 and the read buffer data register 9, values on the external address bus 151 and the external data bus 152, and the state of the external response signal 116 on a machine cycle basis. The response signal 113 and the external response signal 116 are "active-low" signals which are asserted when being low. In this example, the read time of the external memory 150, namely, the time period from the external memory 150 receives the memory access signal 115 and the address output to the external address bus 151 until the external memory 150 outputs the data to the external data bus 152 is 4 machine cycles. Data "data1" is pre-stored at address mem_loc1 of the external memory 150, and data "data2" is pre-stored at address mem_loc2 of the external memory 150. Hereinafter, the operation of the information processing apparatus 200 will be described on a machine cycle basis along the time axis. Cycles t1 through t6 are shown in FIG. 3A, and cycles t7 through t12 are shown in FIG. 3B.

(Cycle t1)

The CPU 120 executes instruction 1. Instruction 1 is a read instruction for addressing an address in the external memory 150 and reading the data stored in the external memory 150. From the CPU 120, address mem_loc1 of the data to be read is output to the bus control unit 130 via the address bus 121. Simultaneously, the read request signal 101 is asserted. In the bus control unit 130, the decoder 4 decodes the decode address 103 supplied via a part of the address bus 121 and identifies the device to be accessed. By execution of instruction 1, the decoder 4 detects that the device to be accessed is the external memory 150 and outputs the device identification signal 104 to notify the control circuit 4 that the device to be accessed is the external memory 150.

The control circuit 4 instructs the elements in the bus control unit 130 to perform a read operation from the external memory 150 based on the read request signal 101 from the CPU 120 and the device identification signal 104 from the decoder 3. First, the control circuit 4 asserts the external access start signal 105 to the memory access signal generation section 5. The memory access signal generation section 5 outputs the memory access signal 115 to the external memory 150 based on the assertion of the memory access signal 115. The control circuit 4 outputs the address control signal 106 to the address interface section 6 to notify that the external memory 150 is to be accessed by the address which is output to the address bus 121 from the CPU 120. The address interface section 6 outputs value mem_loc1 on the address bus 121 output from the CPU 120 to the external address bus 151 via the address bus 151a. The control circuit 4 further outputs the data control signal 107 to the data interface section 7 to notify that the external memory 150 is currently being accessed from the CPU 120, and waits for the assertion of the external response signal 116 from the external memory 150.

(Cycle t2)

Since the external response signal 116 is not asserted, the state remains the same. The value on the address bus 121 and the external address bus 151 are still mem_loc1. The control circuit 4 still waits for the assertion of the external response signal 116.

(Cycle t3)

As in cycle t2, since the external response signal 116 is not asserted, the state remains the same. The value on the address bus 121 and the external address bus 151 are still mem_loc1. The control circuit 4 still waits for the assertion of the external response signal 116.

(Cycle t4)

Four machine cycles have passed since the external memory 150 received the memory access signal 115 and the address from the external address bus 151. Accordingly, the access operation to the external memory 150 (i.e., output of the data corresponding to the read address) is completed, and the external memory 150 asserts the external response signal 116. Based on the assertion of the external response signal 116, the control circuit 4 controls the data interface section 7 so that the data interface section 7 sends the data "data1"

read from the external memory 150 via the external data bus 152 (152a and 152b) to the CPU 120 via the data bus 122. Simultaneously, the control circuit 4 asserts the response signal 113 to notify the CPU 120 of the completion of the read operation. The CPU 120 stores the data "data1" fetched from the data bus 122 in register D0 in the CPU 120 and completes execution of instruction 1.

(Cycle t5)

The CPU 120 executes instruction 2. Namely, the CPU 120 adds 10 to the content of the register D0 (data1) in the CPU 120 and stores the result (data1+10) again in register D0. Thus, execution of instruction 2 is completed.

(Cycle t6)

The CPU 120 executes instruction 3. Namely, the CPU 120 stores value mem_loc2 in register D3 in the CPU 120. Thus, execution of instruction 3 is completed.

(Cycle t7)

The CPU 120 executes instruction 4. Instructions 4 through 9 indicate a process for reading data from the external memory 150 by the CPU 120 using the read buffer address register 8 and the read buffer data register 9. By execution of instruction 4, the CPU 120 writes address mem_loc2 in the external memory 150 as the read address into the read buffer address register 8 in the bus control unit 130. At this point, the CPU 120 outputs address rb_addr assigned for the read buffer address register 8 to the bus control unit 130 via the address bus 121 and simultaneously asserts the write request signal 102.

The address decoder 3 decodes the decode address 103, and after acknowledging that the decoded address is equal to the address assigned for the read buffer address register 8, the address decoder 3 notifies the control circuit 4 of the acknowledgment result by the device identification signal 104. The control circuit 4 is notified by the device identification signal 104 that the address of the read buffer address register 8 should be accessed. Based on the write request signal 102 and the device identification signal 104, the control circuit 4 outputs the data control signal 107 to the data interface section 7 to notify that the data (i.e., the read address for the external memory 150) is to be written into the read buffer address register 8 in the bus control unit 130. Simultaneously, the control circuit 4 asserts the address write signal 108 to the read buffer address register 8. Under the control of the control circuit 4, data mem_loc2 from the CPU 120 is output to the data bus 111 via the data interface section 7, and data mem_loc2 is written into the read buffer address register 8. When the write operation is completed, the control circuit 4 asserts the response signal 113 to notify the CPU 120 of the completion of the write operation. Thus, the CPU 120 completes execution of instruction 4, and starts the subsequent processing in the next cycle.

In the bus control unit 130, when the write operation into the read buffer address register 8 starts, the read operation from the external memory 150 starts simultaneously using content of the read buffer address register 8 (i.e., mem_loc2) as the read address. In detail, the operations are as follows. The control circuit 4 asserts the external access start signal 105 to the memory access signal generation section 5. Based on the assertion of the external access start signal 105, the memory access signal generation section 5 outputs the memory access signal 115 to the external memory 150. The control circuit 4 also outputs the address control signal 106 to notify the address interface section 6 that the external memory 150 is to be accessed using the address stored in the read buffer address register 8. Under the control of the control circuit 4, address mem_loc2 stored in the read buffer address register 8 is supplied to the address interface section 6 via the address bus 112, and then is output to the external address bus 151 via the address bus 151a. The control circuit 4 outputs the data control signal 107 to notify the data interface section 7 that the external memory 150 is currently being accessed for the read operation from the read buffer address register 8. Then, the control circuit 4 waits for the assertion of the external response signal 116 from the external memory 150.

(Cycle t8)

Since the external response signal 116 is not asserted, the state of the bus control unit 130 remains the same. The value on the address bus 121 and the external address bus 151 is still mem_loc2. The control circuit 4 still waits for the assertion of the external response signal 116.

The CPU 120 executes instruction 5. Namely, the CPU 120 adds 1 to the content of register D1 in the CPU 120 and stores the result again in register D1. Thus, execution of instruction 5 is completed.

(Cycle t9)

As in cycle t8, since the external response signal 116 is not asserted, the state of the bus control unit 130 remains the same. The value on the address bus 121 and the external address bus 151 are still mem_loc2. The control circuit 4 still waits for the assertion of the external response signal 116.

The CPU 120 executes instruction 6. Namely, the CPU 120 adds 4 to the content of register A0 in the CPU 120 and stores the result again in register A0. Thus, execution of instruction 6 is completed.

(Cycle t10)

Four machine cycles have passed since the external memory 150 received the memory access signal 115 and the address from the external address bus 151. Accordingly, the access operation to the external memory 150 (i.e., output of the data corresponding to the read address) is completed, and the external memory 150 asserts the external response signal 116.

In the bus control unit 130, under the control of the control circuit 4 which has received the asserted external response signal 116, the data interface section 7 outputs data "data2" read from the external memory 150 via the external data bus 152 (152a and 152b) to the data bus 111. Simultaneously, the control circuit 4 asserts the data write signal 109 to the read buffer data register 9. Thus, the data "data2" is written into the read buffer data register 9. After this cycle, data can be read from the read buffer data register 9 at any time.

While the above-described operation is being performed in the bus control unit 130, the CPU 120 executes instruction 7. Namely, the CPU 120 adds 4 to the content of register A1 in the CPU 120 and stores the result again in register A1. Thus, execution of instruction 7 is completed.

(Cycle t11)

The CPU 120 executes instruction 8. By execution of instruction 8, the CPU 120 reads the data "data2" stored in the read buffer data register 9 in the bus control unit 130. At this point, the CPU 120 outputs address rb_data assigned for the read buffer data register 9 to the bus control unit 130 via the address bus 121 and asserts the read request signal 101.

The address decoder 3 decodes the decode address 103 supplied by a part of the address bus 121, and after acknowledging that the decoded address is equal to the address assigned for the read buffer data register 9, the address decoder 3 notifies the control circuit 4 of the acknowledgment result by the device identification signal 104. Based on the read request signal 101 from the CPU 120 and the device identification signal 104 from the address decoder 3, the control circuit 4 outputs the data control signal 107 to the data interface section 7 to notify that the data is to be read from the read buffer data register 9 in the bus control unit 130. The data interface section 7 reads the data "data2" stored in the read buffer data register 9 via the data bus 111 and sends the data "data2" to the CPU 120 via the data bus 122. The control circuit 4 asserts the response signal 113 to notify the CPU 120 of the completion of the read operation. The CPU 120 stores the data "data2" fetched from the data bus 122 in register D2 in the CPU 120. Thus, execution of instruction 8 is completed.

(Cycle t12)

The CPU 120 executes instruction 9. Namely, the CPU 120 multiplies the content in register D2 in the CPU 120 (data2) by the content in register D0 (data1+10) and stores the result (data2×(data1+10)) again in register D2. Thus, execution of instruction 9 is completed.

As described above, by the information processing apparatus according to the first example, the long-period process (e.g., the data read process from the external memory 150) is performed by executing two divided instructions; i.e., the first instruction for setting an address in the external memory 150 required for the read operation (e.g., instruction 4) and the second instruction for fetching the data read from the external memory 150 (e.g., instruction 8). After execution of the first instruction and before start of execution of the second instruction, at least one third instruction (e.g., instructions 5 through 7) which does not require the data obtained by the read operation is executed. The third instruction, which does not require the data obtained by the read operation, can be executed parallel with the read operation or before the completion of the read operation. Thus, the wait time of the CPU 120 until execution of the second instruction after the execution of the first instruction can be effectively utilized. Due to such a system, the difference between the time period required for the long-period process and the machine cycle of the CPU 120 can be absorbed. The wait time of the information processing apparatus 200 as a whole can be reduced.

EXAMPLE 2

In a second example according to the present invention, the operation of the information processing apparatus 200 for running a different program from the program in the first example will be described. The information processing apparatus 200 has the same structure as that in the first example shown in FIG. 2. In the exemplary program described in the second example, only one instruction (instruction 5) can be inserted between instruction 4 for setting the address in the read buffer address register 8 and instruction 8 for fetching the data stored in the read buffer data register 9, as opposed to three instructions (instructions 5 through 7) in the first example. Instructions in the program are as follows:

Instruction 1: MOV @mem_loc1, D0
Instruction 2: ADD #10, D0
Instruction 3: MOV #mem_loc2, D3
Instruction 4: MOV D3, @rb_addr
Instruction 5: ADD #1, D1
Instruction 8: MOV @rb_data, D2
Instruction 9: MUL D0, D2

The program described in the second example is the same as the program in the first example except that instructions 6 and 7 are excluded in the second example. The program involves a problem in that the CPU 120 starts execution of the read instruction for reading data from the read buffer data register 9 (instruction 8) before the write operation of the data read from the external memory 150 into the read buffer data register 9 is completed.

Figure 4A:
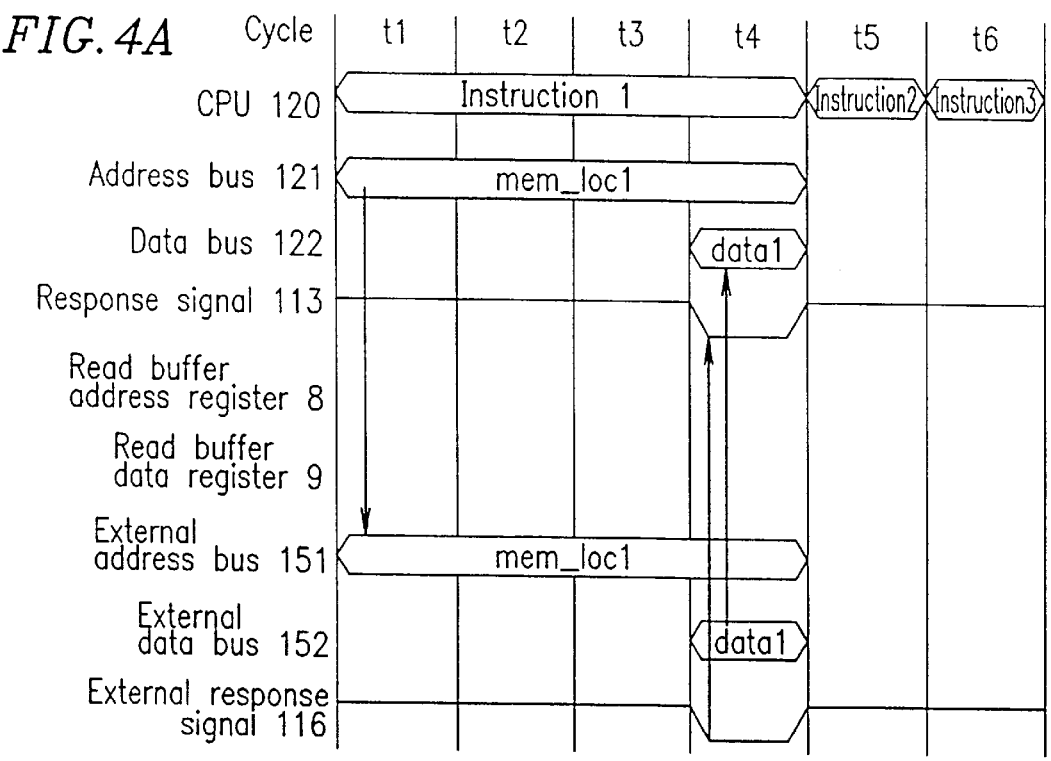
FIGS. 4A and 4B are operational timing diagrams of the information processing apparatus shown in FIG. 2 for running another exemplary program.
Figure 4B:
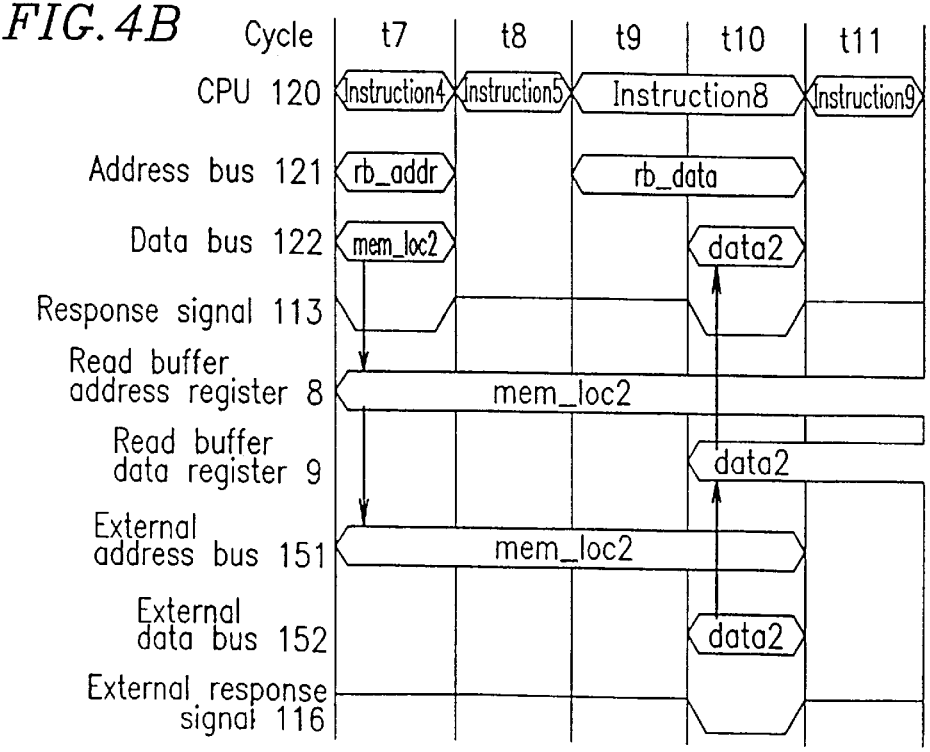

Hereinafter, with reference to FIGS. 4A and 4B, the operation of the information processing apparatus 200 for running the above-described program will be described. FIGS. 4A and 4B are operational timing diagrams of the information processing apparatus 200. Cycles t1 through t6 are shown in FIG. 4A, and cycles t7 through t12 are shown in FIG. 4B. The read time of the external memory 150 is 4 machine cycles. The contents of data stored in the external memory 150 are the same as those in the first example. Hereinafter, the operation of the information processing apparatus 200 will be described on a machine cycle basis along the time axis.

(Cycles t1 through t7)

The operations in cycles t1 through t7 are the same as those in the first example, and thus descriptions thereof will be omitted.

(Cycle t8)

Since the external response signal 116 is not asserted after instruction 5 is executed in cycle t7, the state of the bus control unit 130 remains the same. The values on the address bus 121 and the external address bus 151 are still mem_loc2. The control circuit 4 still waits for the assertion of the external response signal 116.

The CPU 120 executes instruction 5. Namely, the CPU 120 adds 1 to the content of register D1 in the CPU 120 and stores the result again in register D1. Thus, execution of instruction 5 is completed.

(Cycle t9)

The CPU 120 executes instruction 8. By execution of instruction 8, the CPU 120 outputs address rb_data assigned for the read buffer data register 9 to the bus control unit 130 via the address bus 121 and asserts the read request signal 101. The address decoder 3 decodes the decode address 103 supplied by a part of the address bus 121, and after acknowledging that the decoded address is equal to the address assigned for the read buffer data register 9, the address decoder 3 notifies the acknowledgment result to the control circuit 4 by the device identification signal 104. Based on the read request signal 101 from the CPU 120 and the device identification signal 104 from the address decoder 3, the control circuit 4 outputs the data control signal 107 to the data interface section 7 to notify that the data is to be read from the register in the bus control unit 130. However, the data "data2" has not been written in the read buffer data register 9 in cycle t9. Accordingly, the control circuit 4 does not perform the read operation from the read buffer data register 9, and waits for the assertion of the external response signal 116 which indicates the completion of the access operation to the external memory 150, without asserting the response signal 113. Likewise, the CPU 120 waits for the assertion of the response signal 113 without performing any operation.

(Cycle t10)

Four machine cycles have passed since the external memory 150 received the memory access signal 115 and the address from the external address bus 151. Accordingly, the access operation to the external memory 150 (i.e., output of the data corresponding to the read address) is completed, and the external memory 150 asserts the external response signal 116.

The data interface section 7 in the bus control unit 130 outputs the data "data2" read from the external memory 150 via the external data bus 152 (152*a* and 152*b*) to the data bus 111. The control circuit 4 asserts the data write signal 109 to the read buffer data register 9. Thus, the data "data2" is written into the read buffer data register 9. Simultaneously, the control circuit 4 asserts the response signal 113 to notify the CPU 120 of the completion of the read operation from the external memory 150 to the read buffer data register 9. The data interface section 7 further reads the data "data2" stored in the read buffer data register 9 via the data bus 111 and sends the data "data2" to the CPU 120 via the data bus 122. The CPU 120 stores the data "data2" fetched from the data bus 122 in register D2 in the CPU 120. Thus, execution of instruction 8 is completed.

(Cycle t11)

The CPU 120 executes instruction 9. Namely, the CPU 120 multiplies the content in register D2 (data2) in the CPU 120 by the content of register D0 (data1+10) and stores the result (data2×(data1+10)) again in register D2. Thus, execution of instruction 9 is completed.

As described above, by the operation timing in first example (FIGS. 3A and 3B), when the control circuit 4 detects the read instruction for reading data from the read buffer data register 9 (execution of instruction 8), the data read from the external memory 150 is already written in the read buffer data register 9. In such a case, the control circuit 4 immediately asserts the response signal 113, and the CPU 120 executes the read instruction.

By contrast, by the operational timing in second example (FIGS. 4A and 4B), when the control circuit 4 detects the read instruction for reading data from the read buffer data register 9 (execution of instruction 8), the data read from the external memory 150 has not yet been written in the read buffer data register 9. In such a case, the control circuit 4 requests the CPU 120 to halt execution of the read instruction by pausing the assertion of the response signal 113 and waits until the data read from the external memory 150 is written into the read buffer data register 9. When the necessary data is written into the read buffer data register 9, the control circuit 4 asserts the response signal 113 to release the CPU 120 from the halt state and transfers the data to the CPU 120.

As described above, the information processing apparatus 200 according to the first and second examples of the present invention executes the read process by executing two divided instructions; i.e., a first instruction for setting a read address in the read buffer address register 8 and a second instruction for fetching the data stored in the read buffer data register 9, utilizing the scheduling of instructions. By setting a read address for the external memory 150 in the read buffer address register 8 by the first instruction, the bus control unit 130 can read the data from the external memory 150 based on the address stored in the read buffer address register 8, independently from the CPU 120. Accordingly, the CPU 120 can execute other instructions between the first instruction and the second instruction. Thus, the CPU 120 does not have to wait during the long wait period for accessing the external memory 150 as does in the conventional information processing apparatus. Due to such a system, the performance of the information processing apparatus 200 can be improved.

The scheduled instructions can be executed by providing the read buffer address register 8 and the read buffer data register 9 and slightly modifying the conventional control circuit into the control circuit 4. Accordingly, the improved performance of the information processing apparatus 200 can be realized with a significantly smaller size of hardware compared to mounting a cache memory or a prefetch buffer.

According to the second example, as described above, in order to prevent execution of the instruction for reading data from the read buffer data register 9 from starting before the data read from the external memory 150 is written into the read buffer data register 9, the CPU 120 is not allowed to perform the subsequent operations until the external response signal 116 is asserted. In other words, the control circuit 4 requests the CPU 120 to wait by pausing the assertion of the response signal 113. When the write operation into the read buffer data register 9 is completed, the control circuit 4 releases the CPU 120 from the halt state and transfers the data to the CPU 120.

Alternatively, in order to prevent execution of the read instruction from starting before the write operation is completed, the information processing apparatus 200 can operate in the following manner.

When the program is written, the number of machine cycles of the CPU 120 which is required for accessing the external memory 150 is calculated. The instructions are scheduled so that an appropriate number of instructions which do not require the data from the external memory 150 such as an NOP instruction (which causes the program to proceed to the next instruction without any additional operation) are inserted between the first instruction (for setting the read address in the read buffer address register 8; instruction 4 in the second example) and the second instruction (for fetching the data stored in the read buffer data register 9; instruction 8 in the second example). By such setting, the CPU 120 starts execution of the read instruction from the read buffer data register 9 (instruction 8) only after the write operation from the external memory 150 to the read buffer data register 9 is completed.

EXAMPLE 3

Figure 5:
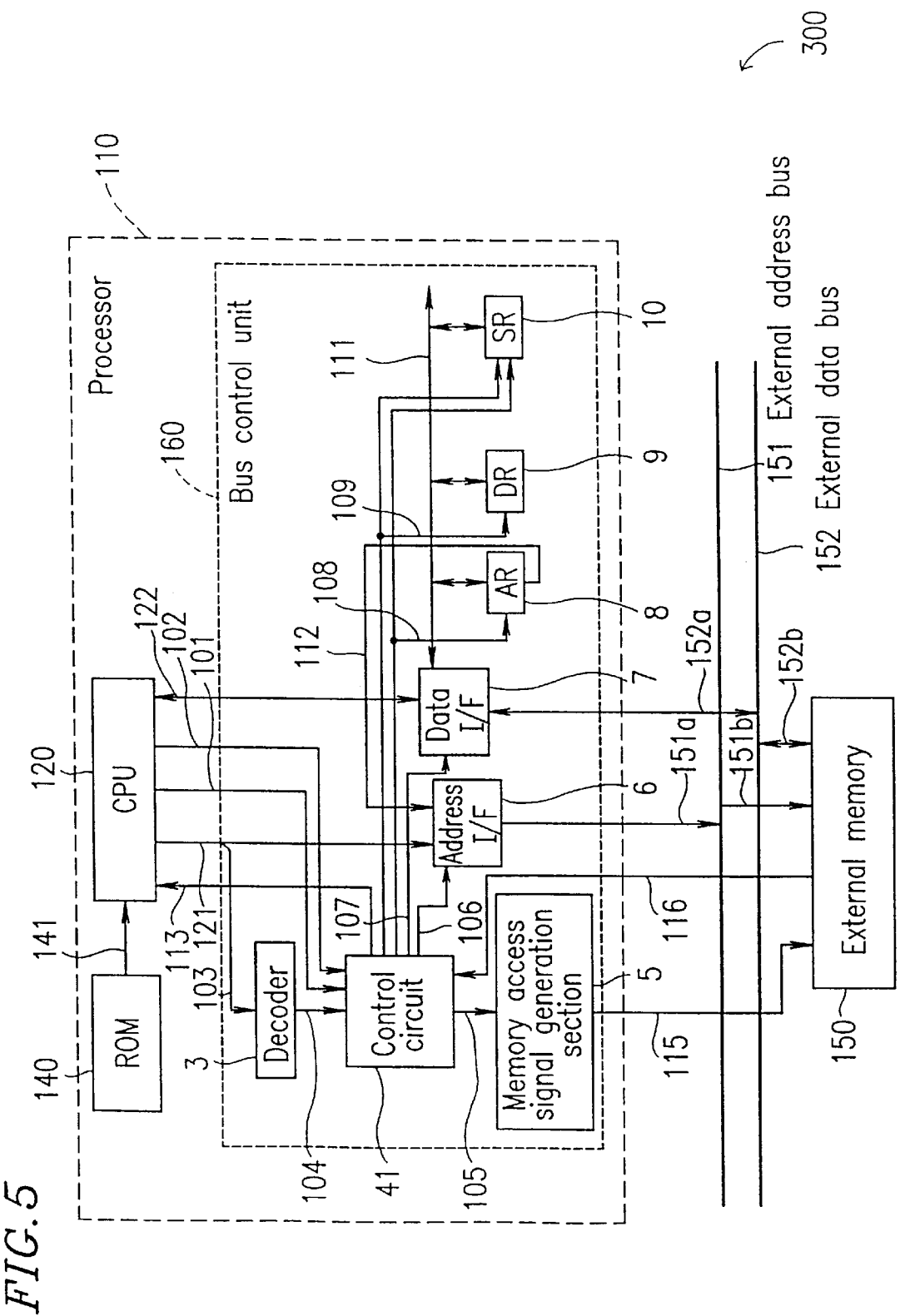
FIG. 5 is a block diagram schematically showing another exemplary structure of the information processing apparatus shown in FIG. 1 when applied for a read process of data from an external memory.

FIG. 5 is a schematic block diagram of an information processing apparatus 300 according to a third example of the present invention. The information processing apparatus 300 has substantially the same structure as that of the information processing apparatus 200 according to the first and second examples. Identical elements previously discussed with respect to FIG. 2 will bear identical reference numerals therewith and the descriptions thereof will be omitted. Hereinafter, the points which are different from the information processing apparatus 200 will be described.

As shown in FIG. 5, the information processing apparatus 300 includes a bus control unit 160. The bus control unit 160 includes an address decoder 3, a control circuit 41, a memory access signal generation section 5, an address interface section 6, a data interface section 7, a read buffer address register 8 and a read buffer data register 9. The bus control unit 160 further includes a read buffer state register 10 for indicating that a write operation into the read buffer data register 9 is completed.

As shown in FIG. 5, the read buffer state register 10 is connected to the data interface section 7 via the data bus 111 as the read buffer address register 8 and the read buffer data register 9. The address write signal 108 which is output from the control circuit 41 for controlling the read buffer address register 8 is also supplied to the read buffer state register 10. Likewise, the data write signal 109 for controlling the read buffer data register 9 is also supplied to the read buffer state register 10.

When a read address is set in the read buffer address register 8 (i.e., when the address write signal 108 to the read buffer address register 8 is asserted), the read buffer state register 10 is put into a first state (e.g., a reset state). When data from the external memory 150 is written into the read buffer data register 9, (i.e., when the data write signal 109 to the read buffer data register 9 is asserted), the read buffer state register 10 is put into a second state (e.g., a set state).

The program is written so that the read buffer state register 10 is examined before the content of the read buffer data register 9 is read, and after it is confirmed that the read buffer state register 10 is in the second state, the content in the read buffer data register 9 is read. By such setting, the CPU 120 can start execution of the read instruction for reading the data from the read buffer data register 9 after the write operation from the external memory 150 to the read buffer data register 9 is completed.

According to the third example, the structure of the control circuit 41 can be simpler than the control circuit 4 in the first and second examples as described below. In the case where the read operation from the external memory 150 is performed by separately executing two instructions, the control circuit 4 in the first and second examples needs to assert the response signal 113 to the CPU 120 based on assertion of the external response signal 116 from the external memory 150 when the read instruction for reading data from the read buffer data register 9 is detected. In other words, the control circuit 4 needs to confirm assertion of the external response signal 116 in response to the read instruction from the read buffer data register 9 as well as in response to the read instruction from the external memory 150.

By contrast, in the third example, the state of the read buffer data register 9 is confirmed by the state of the read buffer state register 10. Accordingly, the CPU 120 does not execute the read instruction for reading data from the read buffer data register 9 unless the write operation into the read buffer data register 9 is completed. Therefore, the control circuit 41 need not notify the CPU 120 of the completion of the write operation into the read buffer data register 9 after confirming the completion by the external response signal 116 from the external memory 150 (i.e., the control circuit 41 need not assert the response signal 113). Thus, the circuit configuration of the control circuit 41 can be simplified.

Alternatively, in order to prevent execution of the read instruction by the CPU 120 before the write operation into the read buffer data register 9 is completed, the following structure may also be used.

The information processing apparatus is structured so that, when the control circuit 4 in the bus control unit 130 detects the start of execution of the read instruction to the read buffer data register 9 by the CPU 120 before the write operation into the read buffer data register 9 is completed, an interrupt request is made from the control circuit 4 to the CPU 120. The information processing apparatus may be programmed so that necessary data can be fetched from the read buffer data register 9 correctly by, for example, inserting an appropriate number of instructions which do not require data from the external memory 150 (third instructions) or examining the content of the state register as described above during the interrupt routine. The read instruction for reading the data from the read buffer data register 9 may be re-executed in the interrupt routine.

In the first through third examples, the completion of the read operation or the write operation is notified to the CPU 120 by sending the external response signal 116 from the external memory 150 to the bus control unit 130 (or 160) and further sending the response signal 113 from the bus control unit 130 to the CPU 120. (Such a system is referred to as the "handshake system".) In an alternative system, supply of the external response signal 116 or supply of the response signal 113 may be omitted. In such a case, a counter for counting the number of cycles required for accessing the external memory 150 is provided, so that the operations are performed after a prescribed time period. (Such a system is referred to as the "fixed wait system".)

In the first through third examples, execution of the instruction for setting the address in the read buffer address register 8 also starts access to the external memory 150. In more detail, when the address output from the CPU 120 is the address assigned for the read buffer address register 8 (the corresponding data to be written into the address assigned for the read buffer address register 8 is the read address in the external memory 150), the control circuit 4 (or 41) writes the read address in the external memory 150 into the read buffer address register 8 as data, and simultaneously accesses the external memory 150 based on the read address written in the read buffer address register 8.

Alternatively, an instruction for setting a read address in the read buffer address register 8 and an instruction for starting accessing the external memory 150 may be separately provided. In such a case, the size of the program for repeatedly reading the data from the same address in the external memory 150 can be reduced.

EXAMPLE 4

In the first through third examples, the information processing apparatuses 200 and 300 for performing a process for reading data from the external memory 150 as an example of the long-period process are described. The process is performed by separately executing two instructions, i.e., a first instruction for setting a read address in the read buffer address register 8 and a second instruction for fetching the data stored in the read buffer data register 9. In a fourth example, a process for a mathematical operation performed using a mathematical operation device will be described as an example of the long-period process. A process for a mathematical operation is a data processing which requires a relatively long time period such as multiplication, division, addition or subtraction. According to the fourth example, a process for a mathematical operation is performed by executing two separate instructions; i.e., an instruction for setting operand data and starting a mathematical operation and an instruction for fetching the mathematical operation result.

Figure 6:
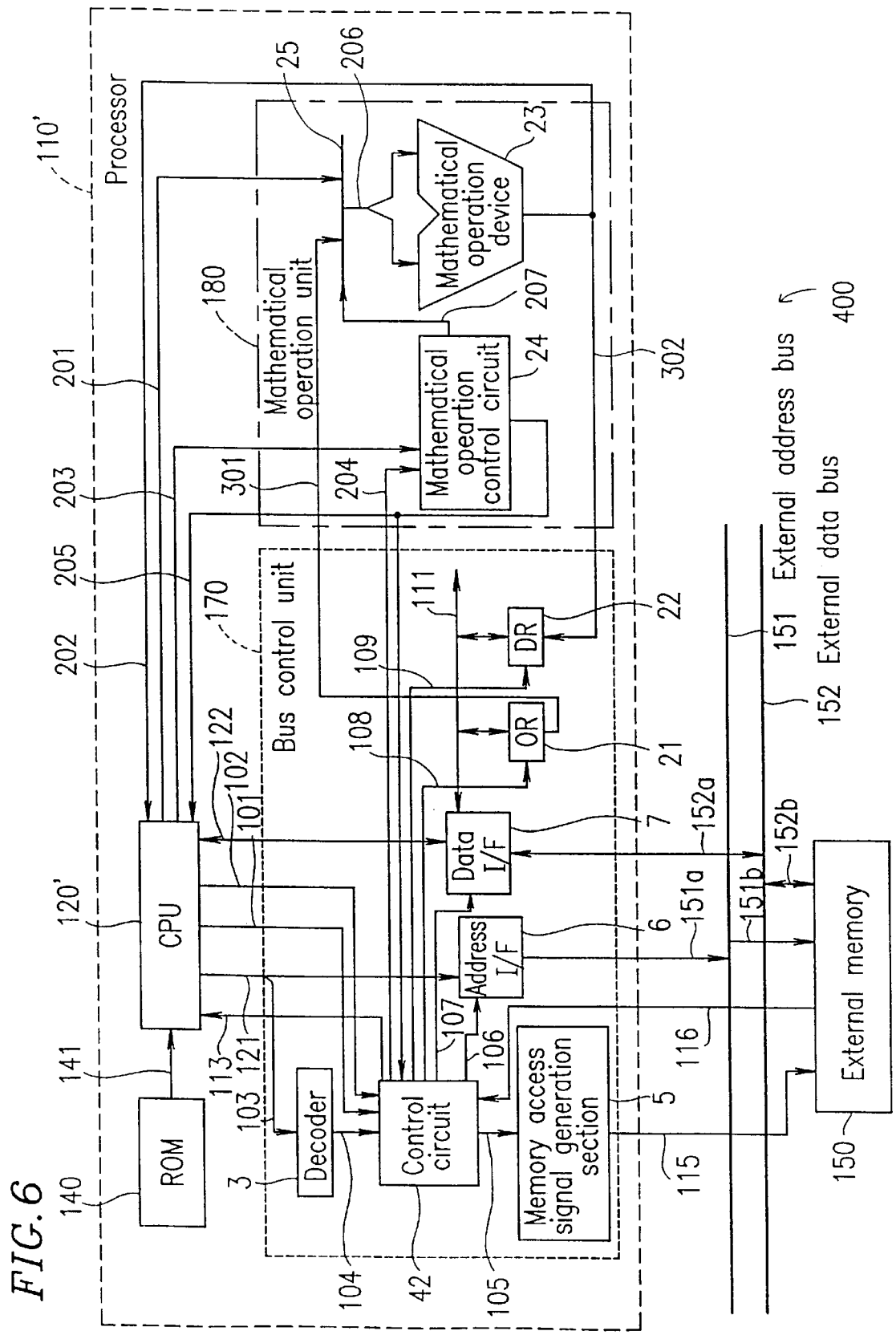
FIG. 6 is a block diagram schematically showing an exemplary structure of the information processing apparatus shown in FIG. 1 when applied for a mathematical operation.

FIG. 6 is a schematic block diagram of an information processing apparatus 400 according to the fourth example of the present invention. As shown in FIG. 6, the information processing apparatus 400 includes a processor 110' and an external memory 150. The processor 110' includes a CPU 120', a bus control unit 170, a ROM 140 and a mathematical operation unit 180. The bus control unit 170 includes an address decoder 3, a control circuit 42, a memory access signal generation section 5, an address interface section 6, a data interface section 7, an operand register 21, and an operation result register 22. The CPU 120' and the bus control unit 170 are connected to each other via an address bus 121 for sending addresses and a data bus 122 for transferring data. The CPU 120' and the mathematical operation unit 180 are connected to each other via a CPU operand bus 201 for sending operand data required for the mathematical operation and an operation data bus 202 for transferring the mathematical operation result. The operand register 21 in the bus control unit 170 is connected to the mathematical operation unit 180 via an operand bus 301 for the register (hereinafter, referred to simply as the operand bus 301), and an operation result register 22 is connected to the mathematical operation unit 180 via an operation data bus 302 for the registers (hereinafter, referred to simply as the operand data bus 302). From the ROM 140, programs and instructions are sent to the CPU 120' via an instruction bus 141.

The structure of the bus control unit 170 is substantially the same as that of the bus control unit 130 of the information processing apparatus 200 in the first and second examples, except that the bus control unit 170 includes the operand register 21 and the operation result register 22 in lieu of the read buffer address register 8 and the read buffer data register 9. The control circuit 42 inputs a mathematical operation request signal 204 to the mathematical operation unit 180 and receives a mathematical operation completion signal 205 from the mathematical operation unit 180. Except for this point, the control circuit 42 has the same structure as that of the control circuit 4 in the information processing apparatus 200.

As shown in FIG. 6, the mathematical operation unit 180 includes a mathematical operation device 23, a mathematical operation control circuit 24 and a selector 25. Operand data from the CPU 120' is input to the selector 25 via the operand bus 201, and operand data from the operand register 21 in the bus control unit 170 is input to the selector 25 via the operand bus 301. The mathematical operation result obtained by the mathematical operation device 23 is supplied to the CPU 120' via the operation data bus 202 and also supplied to the operation result register 22 in the bus control unit 170 via the operation data bus 302. In FIG. 6, the operand buses 201, 206 and 301 carry the two parts of the operand data for the mathematical operation. For example, when the mathematical operation is multiplication of A×B, the upper bits of each bus carry data A and the lower bits of each bus carry data B.

The mathematical operation control circuit 24 outputs an operand selection signal 207 to the selector 25 based on a first mathematical operation request signal 203 supplied from the CPU 120' and a second mathematical operation request signal 204 supplied from the control circuit 42 in the bus control unit 170. The mathematical operation completion signal 205 output from the mathematical operation control circuit 24 is supplied to the CPU 120' and the control circuit 42.

Regarding the other points, the information processing apparatus 400 has the same structure as that of the information processing apparatus 200 as can be appreciated from FIG. 6.

Hereinafter, the operation of the information processing apparatus 400 will be described.

For performing a usual mathematical operation instruction, the information processing apparatus 400 operates, for example, in the following manner. The CPU 120' asserts the first mathematical operation request signal 203, and thus a mathematical operation using the operand data supplied via the operand bus 201 starts in the mathematical operation unit 180. The mathematical operation control circuit 24 outputs the operand selection signal 207 to the selector 25 based on the first mathematical operation request signal 203. The selector 25 selects the operand data from the CPU 120' and inputs the selected operand data to the mathematical operation device 23. When the mathematical operation is completed, the mathematical operation control circuit 24 asserts the mathematical operation completion signal 205, and the mathematical operation result is sent to the CPU 120' via the operation data bus 202.

For performing a long-period process for a mathematical operation by executing two divided instructions, the information processing apparatus 400 operates, for example, in the following manner. The CPU 120' first executes a first instruction for writing operand data into the operand register 21. When the write operation of the operand data into the operand register 21 is completed, the control circuit 42 asserts a second mathematical operation request signal 204 to the mathematical operation unit 180. The second mathematical operation request signal 204 is output to the mathematical operation control circuit 24, and the corresponding operand selection signal 207 is output to the selector 25. The selector 25 selects the operand data which is supplied from the operand register 21 via the operand bus 301 in correspondence with the operand selection signal 207, and inputs the selected operand data to the mathematical operation device 23. When the mathematical operation is completed, the mathematical operation control circuit 24 asserts the mathematical operation completion signal 205. Based on the mathematical operation completion signal 205, the control circuit 42 writes the mathematical operation result data which is output to the operation result bus 302 into the operation result register 22. At this point, since the CPU 120' does not execute the mathematical operation instruction (i.e., the first mathematical operation request signal 203 is not asserted), the mathematical operation completion signal 205 is ignored.

While the mathematical operation is performed in the mathematical operation unit 180 and the mathematical operation result is written into the operation result register 22, the CPU 120' can execute a plurality of instructions (third instructions) which do not require the mathematical operation result data. After executing the third instructions, the CPU 120' reads the mathematical operation result stored in the operation result register 22 and thus obtains the mathematical operation result.

In the fourth example, as in the case of reading data from the external memory 150, the read operation for reading data from the operation result register 22 can be halted or the CPU 120' can be put into a wait state by a system in which the completion of the mathematical operation is notified to the CPU 120' by assertion of the response signal 113. Alternatively, the instructions may be scheduled so that a required number of third instructions (e.g., an NOP instruction) are inserted between the instruction for writing operand data and the instruction for reading the mathematical operation result data, by calculating the number of machine cycles required for the mathematical operation beforehand.

In the above-described examples, one set of read buffers (read buffer address register 8 and read buffer data register 9) or one set of mathematical operation buffers (operand register 21 and operation result register 22) is provided. Alternatively, a plurality of sets of such read buffers or mathematical operation buffers may be provided. In such a case, for example, in the information processing apparatus 200 or 300, the CPU 120 sets a read address in the external memory 150 sequentially in the read buffer address registers of the plurality of sets, independently from the operation of the bus control unit 130. In the bus control unit 130, the control circuit 4 (or 41) sequentially fetches the address from the read buffer address registers of the plurality of sets, and stores the data read from the external memory 150 into the corresponding read buffer address registers sequentially. In the information processing apparatus 400, the operand register 21 and the operation result register 22 can be operated by the read instruction and write instruction (read request signal or write request signal) as in the case of the read operation of data from the external memory 150.

Accordingly, the operand register 21 and the operation result register 22 may also be used as the read buffer address register and the read buffer data register for a process for reading data from the external memory 150, by providing a mechanism for determining whether the write operation of data into the operand register 21 is performed for the read process of data from the external memory or for a process for a mathematical operation.

EXAMPLE 5

In a fifth example, a device for scheduling the instructions which are described in the first through fourth examples will be described.

Scheduling of instructions is performed when, for example, a program including a plurality of instructions described by a high-level (symbolic) language or an assembly language is translated into a machine language, and is realized by arranging the order of the instructions.

Figure 7:
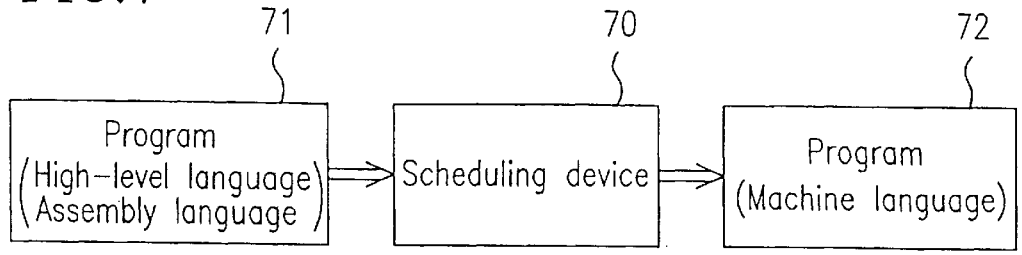
FIG. 7 schematically shows a scheduling device according to the present invention.

FIG. 7 schematically shows the operation of a scheduling device 70 according to the fifth example of the present invention. As shown in FIG. 7, the scheduling device 70 translates a program 71 described in a high-level language or an assembly language into a program 72 in a machine language. During the translation, the order of the instructions is arranged as described below.

Figure 8:
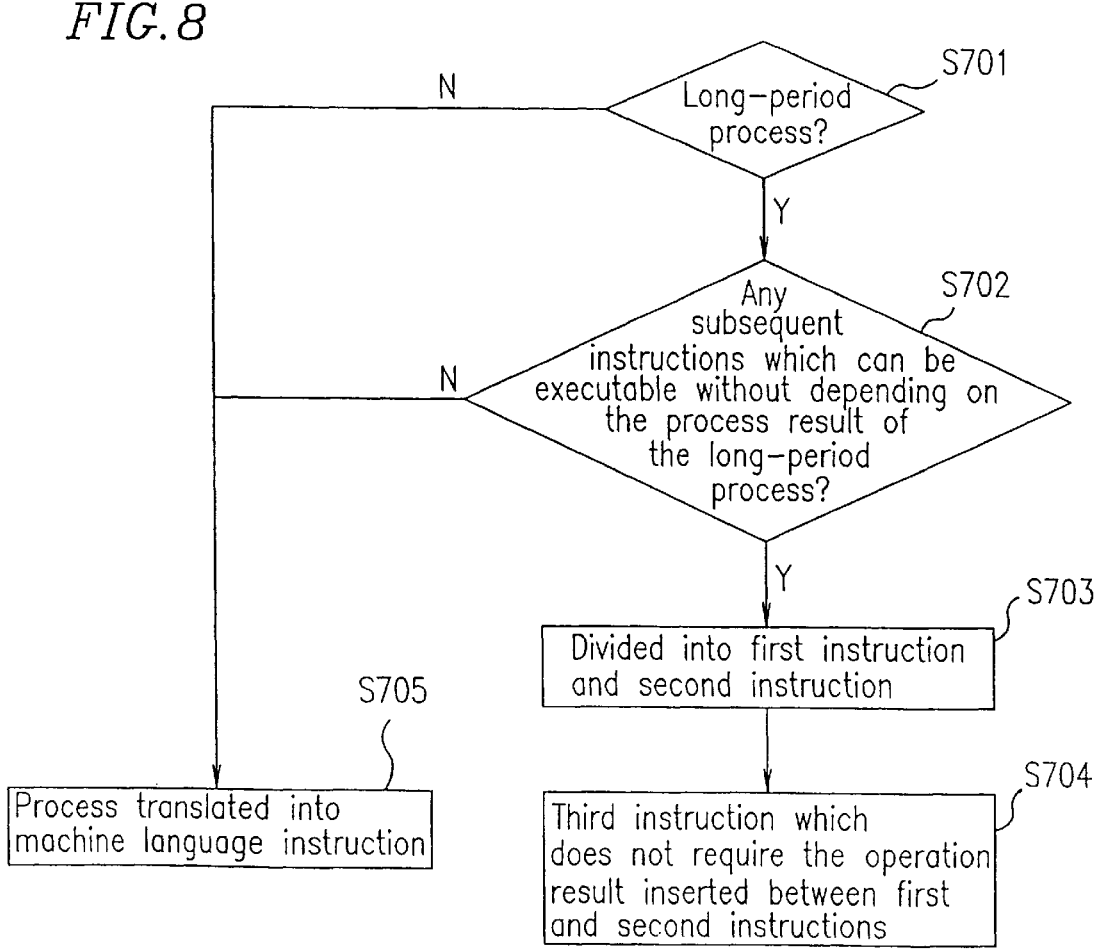
FIG. 8 is a flowchart illustrating the operation of the scheduling device according to the present invention.
Figure 9:
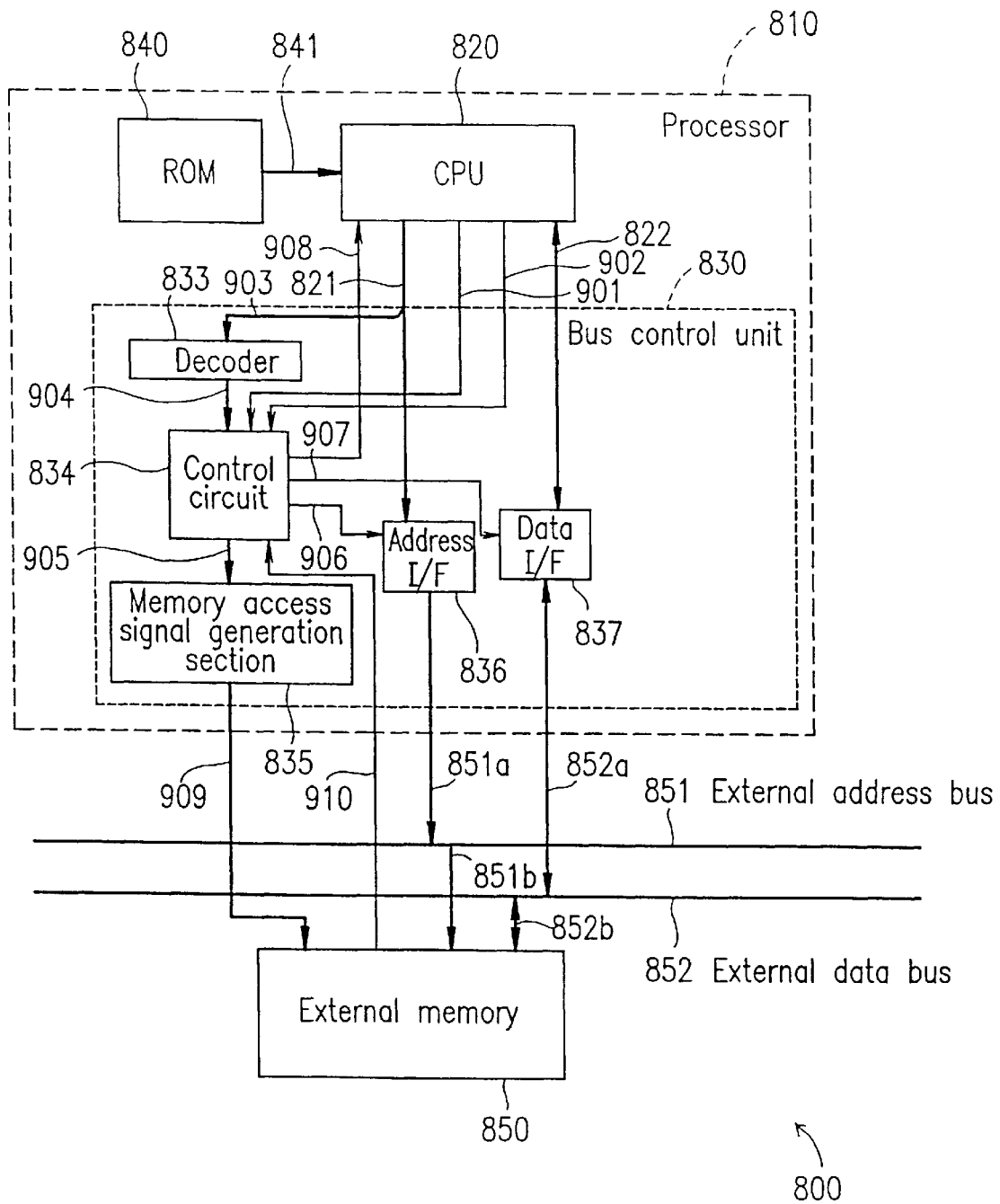
FIG. 9 is a block diagram schematically showing the structure of a conventional information processing apparatus.
Figure 10A:
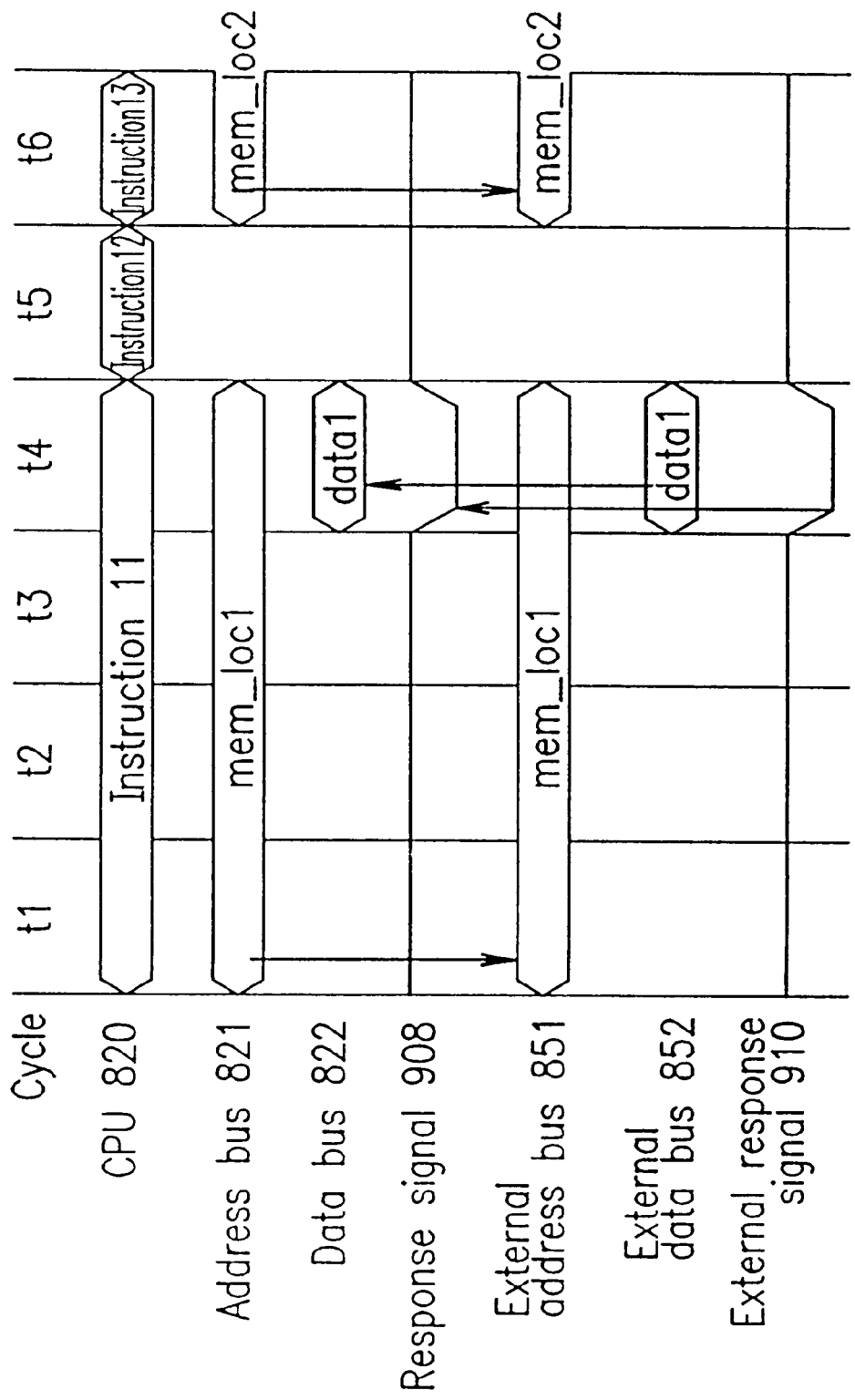
FIGS. 10A and 10B are operational timing diagrams of the conventional information processing apparatus shown in FIG. 9.
Figure 10B:
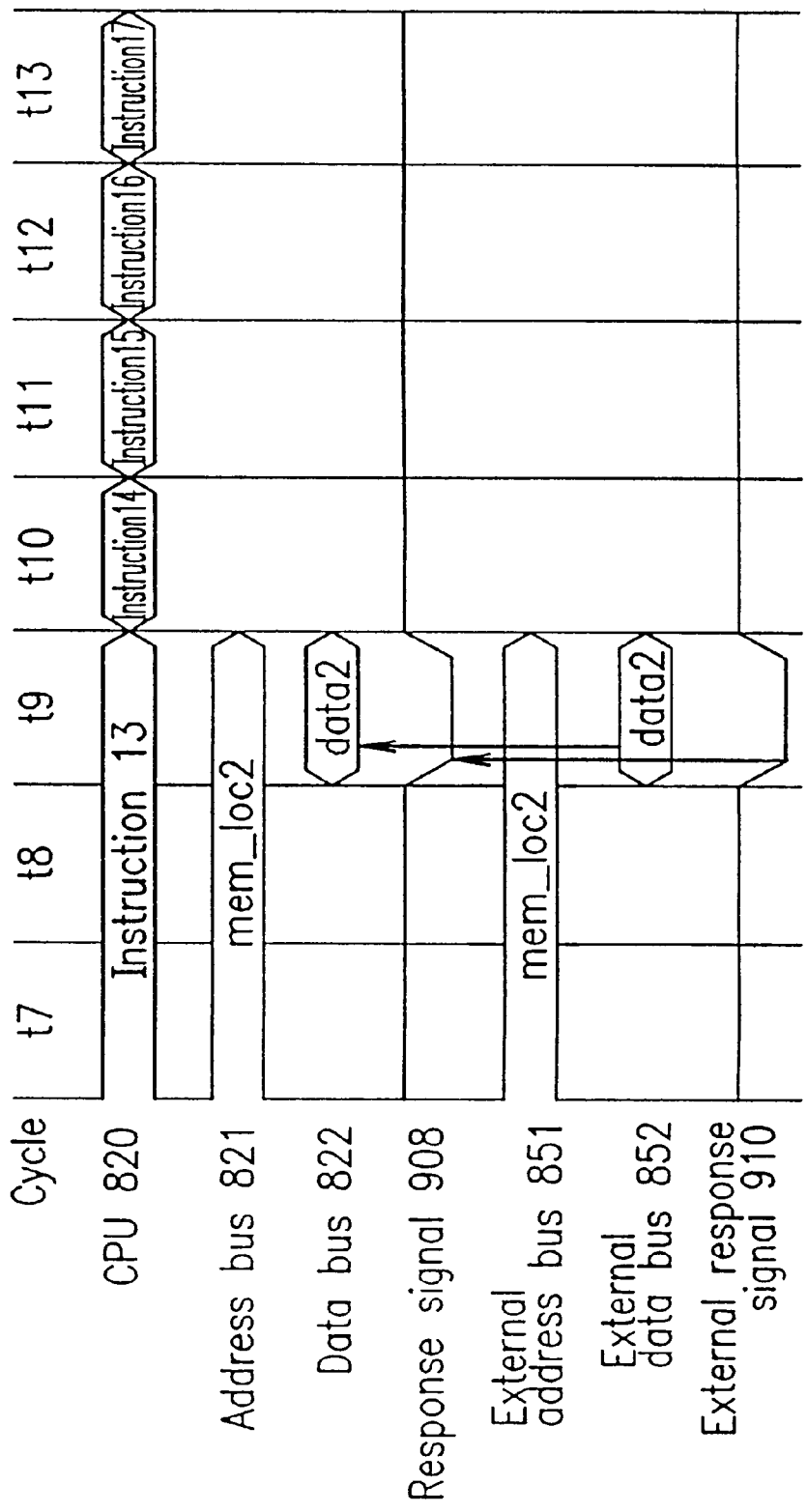

FIG. 8 is a flowchart illustrating the operation of the scheduling device 70. As shown in FIG. 8, the scheduling device 70 first estimates the process time which is required to complete a process performed by each instruction and determines whether or not the process is a long-period process (step S701). The long-period process refers to a process which requires a relatively long time period compared to one machine cycle for executing an instruction by the CPU 20. For example, the long-period process requires at least 2 machine cycles. If the process is determined not to be a long-period process, scheduling of instructions is not performed, and the process is translated into an instruction in the machine language (step S705).

If the process is determined to be a long-period process, it is determined whether or not the subsequent instructions include one or more instructions which can be executed by the CPU without depending on the process result of the long-period process (step S702). If no such appropriate instruction is found in step S702, the long-period process is translated into an instruction in the machine language (step S705).

If one or more appropriate instructions are found in step S702, the long-period process is divided into two instructions; i.e., a first instruction for setting first data required for operations performed in the long-period process and a second instruction for fetching second data obtained by execution of the first instruction (step S703). Then, at least one of the appropriate instructions found in step S702 is inserted as a third instruction after execution of the first instruction and before start of execution of the second instruction (step S704).

As described above, according to the present invention, a long-period process such as a process for reading data from an external memory or a process for a mathematical operation is performed by executing two separate instructions and at least one instruction which does not require the result obtained by execution of the first instruction is inserted between the two instructions. Due to such a system, the difference between the time period required for the long-period process and one machine cycle of the CPU is effectively absorbed. Thus, an information processing apparatus and method which requires less wait time for executing instructions can be provided. Moreover, according to the present invention, the above-described absorption of the time difference can be realized by a slight increase in the size of hardware.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information processing apparatus comprising an instruction storage for storing a plurality of instructions and a central processing unit for fetching the instructions from the instruction storage device so as to execute the instructions, wherein:

the central processing unit separately executes a first instruction and a second instruction which are obtained by dividing a process for performing at least one operation, the first instruction being an instruction for setting first data and the second instruction being an instruction for fetching second data representing a result obtained by performing an at least predetermined one of the at least one operation using the first data, and the central processing unit executes at least one third instruction after executing the first instruction and before executing the second instruction, the third instruction not requiring the second data.

2. An information processing apparatus according to claim 1, further comprising a memory device, wherein:

the at least predetermined one of the at least one operation is a read operation of information stored in the memory device, the first data is a read address of the information to be read in the memory device, and the read address is set in a prescribed memory area by the first instruction.

3. An information processing apparatus according to claim 2, wherein the first instruction includes a command for starting the read operation based on the read address set in the memory area.

4. An information processing apparatus according to claim 1, wherein:

the at least predetermined one of the at least one operation is a mathematical operation, the first data is operand data for the mathematical operation, and the operand data is set in a prescribed memory area by the first instruction.

5. An information processing apparatus according to claim 4, wherein the first instruction includes a command for starting the mathematical operation based on the operand data set in the memory area.

6. An information processing apparatus according to claim 1, further comprising first and second registers for holding data and a control circuit for controlling the first and second registers, wherein the control circuit writes the first data into the first register based on the first instruction, performs the at least predetermined one of the at least one operation based on the first data written in the first register, writes the second data obtained by the at least predetermined one of the at least one operation into the second register, and transfers the second data held in the second register to the central processing unit based on the second instruction.

7. An information processing apparatus according to claim 6, further comprising a memory device, wherein:
the control circuit controls access to the memory device,
the at least predetermined one of the at least one operation is a read operation of information stored in the memory device,
the first data is a read address in the memory device of the information to be read, and
the second data is the information read from the memory device.

8. An information processing apparatus according to claim 7, wherein the first instruction includes a command for starting the read operation based on the read address set in the first register.

9. An information processing apparatus according to claim 7, wherein:
the central processing unit fetches the first instruction from the instruction storage and outputs the read address of the information in the memory device to be read; after the address is output, executes at least one third instruction which does not require the information read from the memory device; and after the at least one third instruction is executed, fetches the second instruction from the instruction storage to execute the second instruction,
the first register receives and holds the read address output from the central processing unit under the control of the control circuit,
the memory device receives the read address held in the first register and outputs the information based on the received read address under the control of the control circuit while the at least one third instruction is being executed,
the second register receives and holds the information output from the memory device under the control of the control circuit, and
the control circuit transfers the information held in the second register by the second instruction executed by the central processing unit.

10. An information processing apparatus according to claim 9, further comprising an address decoder for decoding at least a part of the address which is output from the central processing unit, wherein:
a first address area is assigned for the first register and a second address area is assigned for the second register,
the first instruction is a write instruction for writing the read address into the first address area, and the second instruction is a read instruction for reading the information held in the second address area,
the central processing unit outputs an address into which the read address is to be written based on the first instruction and outputs the address holding the information to be read based on the second instruction,
the control circuit detects that the address decoded by the address decoder is equal to the address in the first address area in execution of the first instruction and thus acknowledges a write operation into the first register, and
the control circuit detects that the address decoded by the address decoder is equal to the address in the second address area in execution of the second instruction and thus acknowledges a read operation from the second register.

11. An information processing apparatus according to claim 6, wherein:
the at least predetermined one of the at least one operation is a mathematical operation,
the first data is operand data for the mathematical operation, and
the second data is a mathematical operation result data obtained by treating the operand data by the mathematical operation.

12. An information processing apparatus according to claim 11, wherein the first instruction includes a command for starting the mathematical operation based on the operand data set in the first register.

13. An information processing apparatus according to claim 6, wherein, in the case where the control circuit detects execution of the second instruction before the write operation into the second register is completed, the control circuit requests the central processing unit to halt execution of the second instruction; and when the write operation is completed, the control circuit releases the halt and transfers the second data written in the second register to the central processing unit.

14. An information processing apparatus according to claim 6, wherein the central processing unit executes a prescribed number of third instructions determined by characteristics of the at least predetermined one of the at least one operation, and thus prevents the second instruction from being executed before the write operation of the second data into the second register is completed.

15. An information processing apparatus according to claim 6, further comprising a state register, wherein:
the control circuit sets the state register to a first state for writing the first data into the first register, and sets the state register to a second state for writing the second data into the second register, and
the central processing unit executes an instruction for confirming that the state register is in the second state before executing the second instruction.

16. An information processing apparatus according to claim 6, wherein, in the case where the control circuit detects execution of the second instruction before the write operation into the second register is completed, the control circuit requests the central processing unit to perform a subroutine program.

17. An information processing apparatus according to claim 16, wherein the subroutine program is an interrupt program, and the second instruction is re-executed in the interrupt program.

18. A scheduling device for translating a first program including a plurality of instructions written in either one of a high-level language or an assembly language into a second program described in a machine language and for arranging the order of the plurality of instructions of the first program during the translation of the first program into the second program, the scheduling device comprising:
a first detector for determining a process time required to complete a process performed by each of the plurality of instructions and detecting a process requiring at least two machine cycles as a long-period process, the machine cycle being a time unit for executing an instruction by a central processing unit for running the program;
a second detector for detecting whether or not the program includes at least one subsequent instruction which can be executed by the central processing unit without depending on a process result obtained by the long-period process; and order arrangement means for arranging the order of the plurality of instructions based on the detection results of the first detector and the second detector, wherein, in the case where the first detector detects a long-period process and the second detector detects the at least one subsequent instruction, the order arrangement means separates the long-period process into a first instruction for setting first data required for the operations performed in the long-period process and a second instruction for fetching second data obtained based on the operations, and inserts the at least one instruction detected by the second detector as a third instruction after the first instruction and before the second instruction.

19. An information processing method using an instruction storage for storing a plurality of instructions and a central processing unit for fetching the instructions from the instruction storage so as to execute the instructions, the method comprising the steps of:

executing a first instruction for setting first data;

executing at least one third instruction after executing the first instruction, the third instruction not requiring second data representing a result obtained by performing an at least predetermined one of at least one operation; and executing a second instruction for fetching the second data, wherein the first instruction and the second instruction are obtained by dividing a process for performing the at least one operation.

20. An information processing method using an instruction storage for storing a plurality of instructions, a central processing unit for fetching the instructions from the instruction storage so as to execute the instructions, and first and second registers for holding data, the method comprising the steps of:

executing a first instruction for setting first data;

writing the first data into the first register based on the first instruction;

executing at least one third instruction after executing the first instruction, the third instruction not requiring second data representing a result obtained by performing an at least predetermined one of at least one operation;

performing the at least predetermined one of the at least one operation based on the first data written in the first register while the at least one third instruction is being executed, and writing the second data into the second register;

executing a second instruction for fetching the second data; and transferring the second data held in the second register based on the second instruction, wherein the first instruction and the second instruction are obtained by dividing a process for performing the at least one operation.

21. An information processing method according to claim 20, further comprising the steps of:

in the case where the second instruction is fetched before a write operation of the second data into the second register is completed, requesting the central processing unit to halt execution of the second instruction; and when the write operation of the second data into the second register is completed, releasing the halt and transferring the second data written in the second register to the central processing unit.

22. An information processing method according to claim 20, wherein the step of executing the at least one third instruction includes the step of executing a plurality of third instructions determined by characteristics of the at least predetermined one of the at least one operation, thereby preventing the second instruction from being executed before the write operation of the second data into the second register is completed.

23. An information processing apparatus comprising an instruction storage for storing a plurality of instructions and a central processing unit for fetching the instructions from the instruction storage device so as to execute the instructions, wherein:

the central processing unit separately executes a first instruction and a second instruction for performing at least one operation, the first instruction being an instruction for setting first data and the second instruction being an instruction for fetching second data representing a result obtained by performing an at least predetermined one of the at least one operation using the first data, and the central processing unit executes at least one third instruction after executing the first instruction and before executing the second instruction, the third instruction not requiring the second data.

* * * * *